United States Patent [19]

Tanaka et al.

[11] Patent Number: 5,473,148
[45] Date of Patent: Dec. 5, 1995

[54] BARCODE SYMBOL READING SYSTEM CAPABLE OF SHORTENING TIME FOR READING AND DECODING

[75] Inventors: Hisakatsu Tanaka; Kazunori Shionoya, both of Tokyo, Japan

[73] Assignee: Olympus Optical Co., Ltd., Tokyo, Japan

[21] Appl. No.: 287,159

[22] Filed: Aug. 8, 1994

[30]  Foreign Application Priority Data

Aug. 11, 1993 [JP] Japan .................................. 5-199458
Aug. 24, 1993 [JP] Japan .................................. 5-209614

[51] Int. Cl.$^6$ ....................................................... G06K 7/10
[52] U.S. Cl. ........................................... 235/462; 235/454
[58] Field of Search ..................................... 235/454, 462

[56]  References Cited

U.S. PATENT DOCUMENTS 4,096,992  6/1978  Nojiri et al. ............................ 235/462
4,794,239  12/1988  Allais .................................... 235/462

FOREIGN PATENT DOCUMENTS 4-256085  9/1992  Japan .
6-266881  9/1994  Japan .

Primary Examiner—Donald Hajec
Assistant Examiner—Michael G. Lee
Attorney, Agent, or Firm—Frishauf, Holtz, Goodman, Langer & Chick

[57]  ABSTRACT

In a barcode symbol reading apparatus which can execute high-speed processing even when a one-dimensional image pickup device is used, a pulse width count circuit counts the number of widths of bars and spaces of a barcode symbol from an image pickup signal from a 1DCCD array, and stores the count result in a FIFO memory. A data processing circuit fetches a width data string for each scan from the FIFO memory, and when the data processing circuit detects the sizes in the row and column directions and security level from the fetched width data string using a row indicator, the data processing circuit counts the number of times of appearance of an identical row indicator to obtain the number of scan times per row, which indicates the relative moving speed between the 1DCCD array and the barcode symbol. Thereafter, the data processing circuit processes the width data string read out from the FIFO memory while skipping scans corresponding to the number of scan times per row.

20 Claims, 27 Drawing Sheets

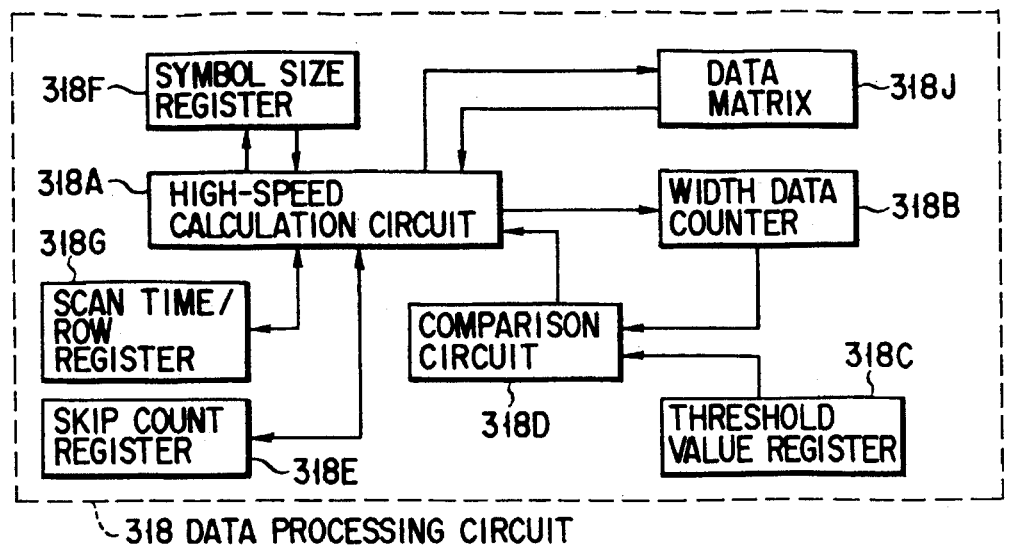
F I G. 4A
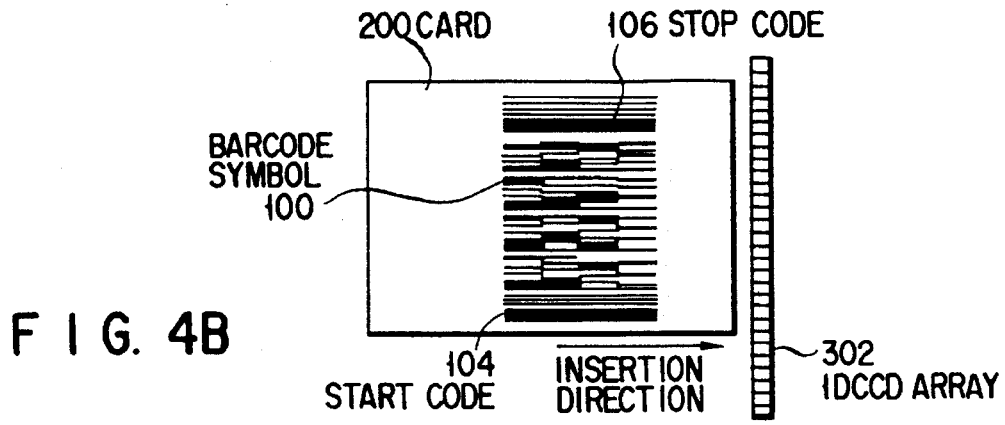
F I G. 4B
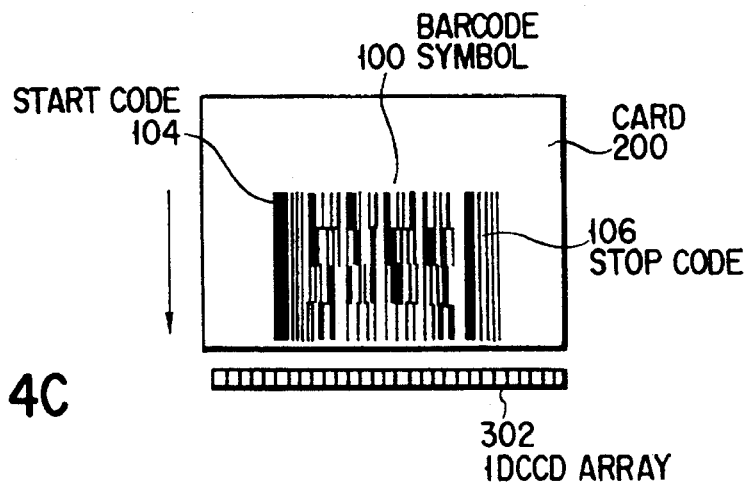
F I G. 4C

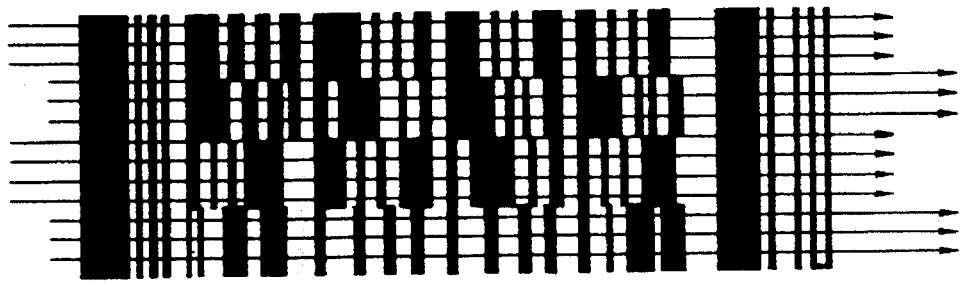
F I G. 6A
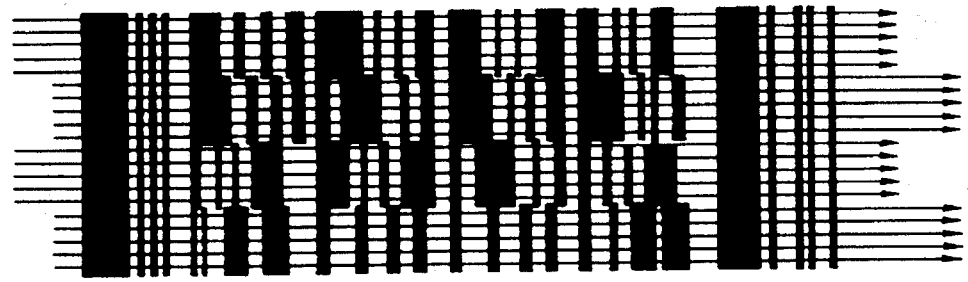
F I G. 6B
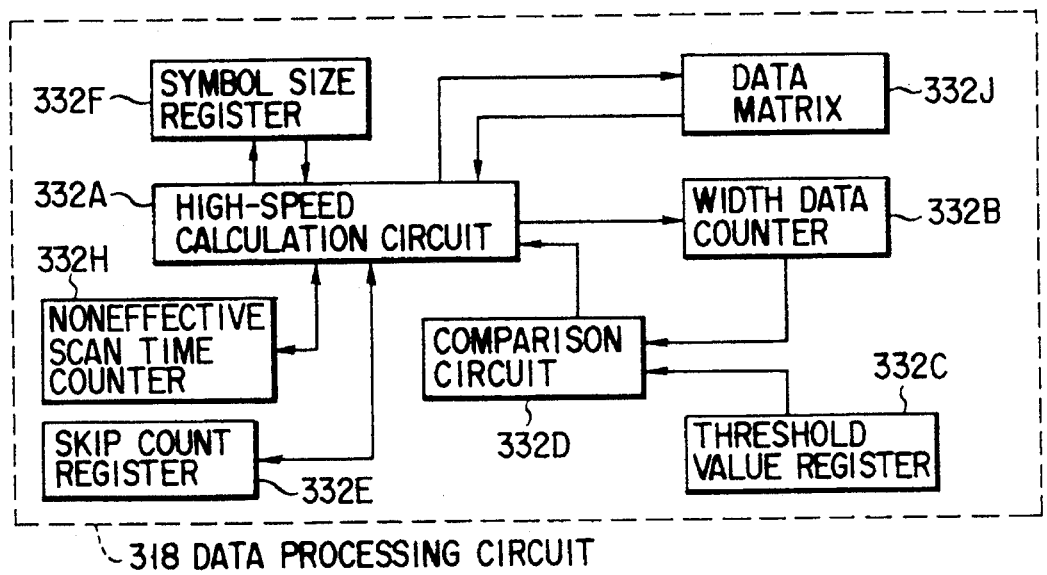
F I G. 6C

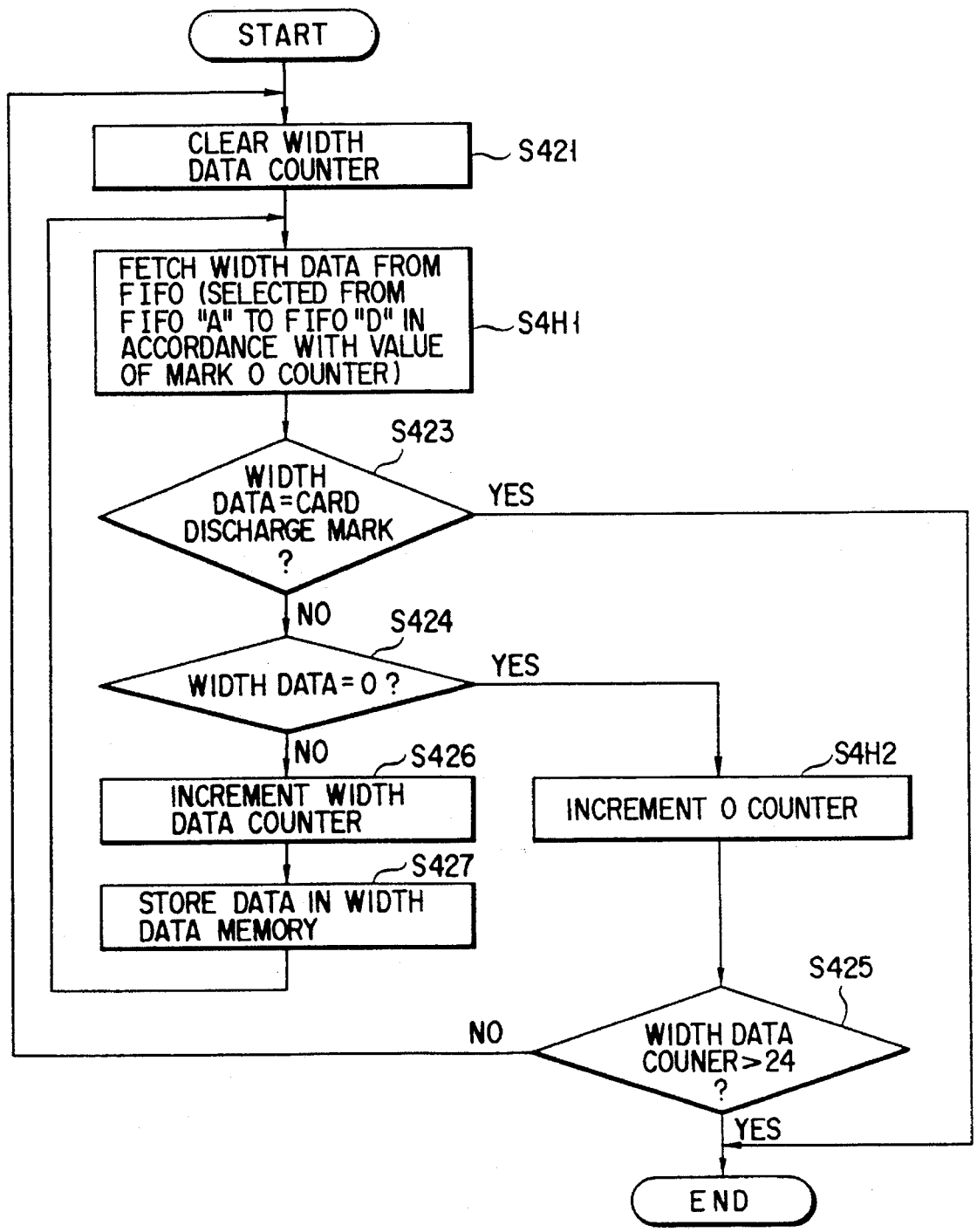
F I G. 16

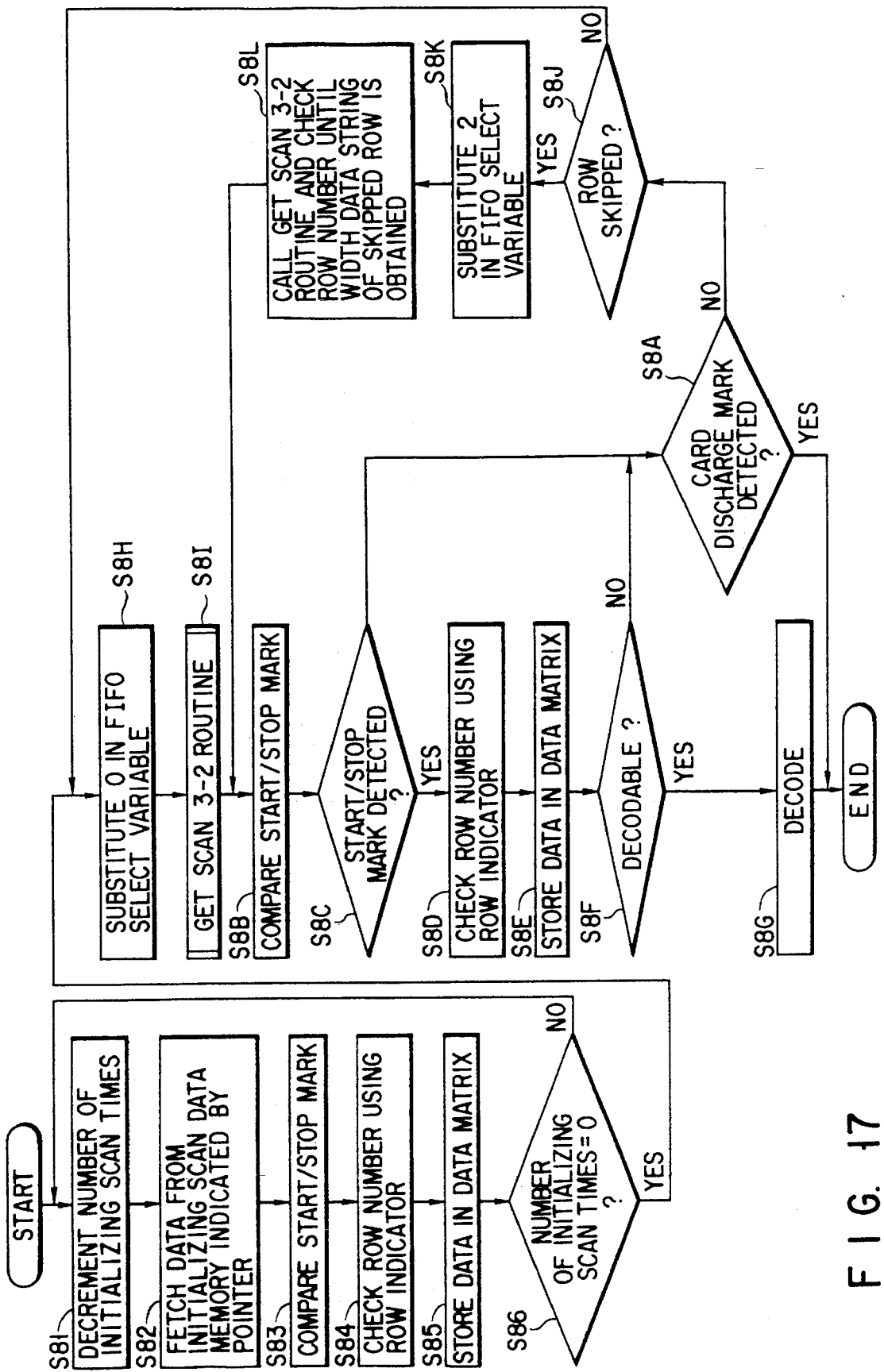
F I G. 17

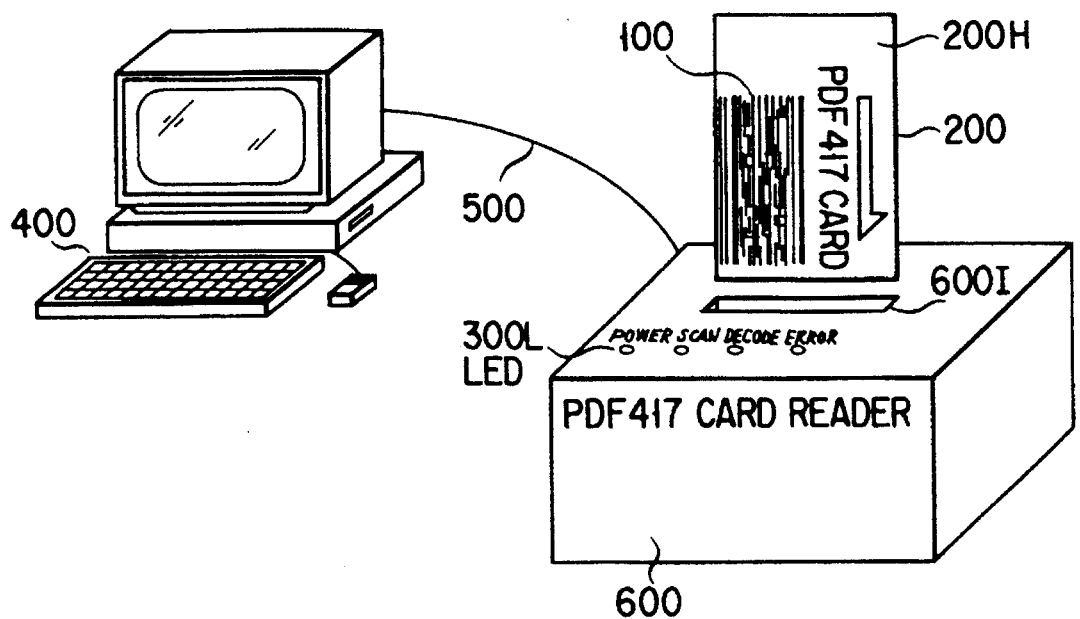
F I G. 20A
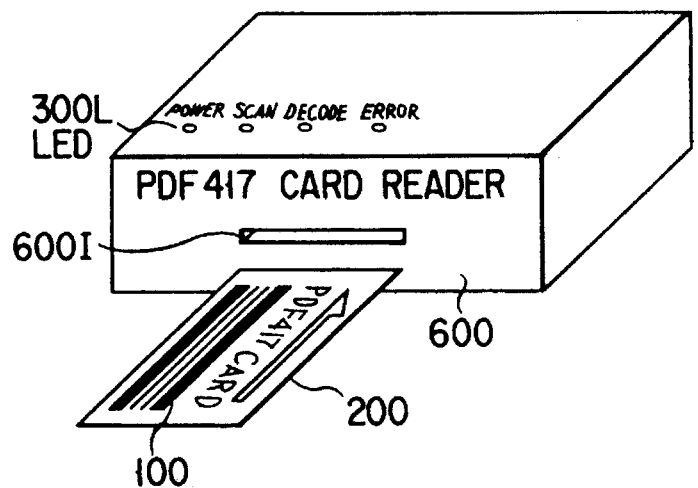
F I G. 20B

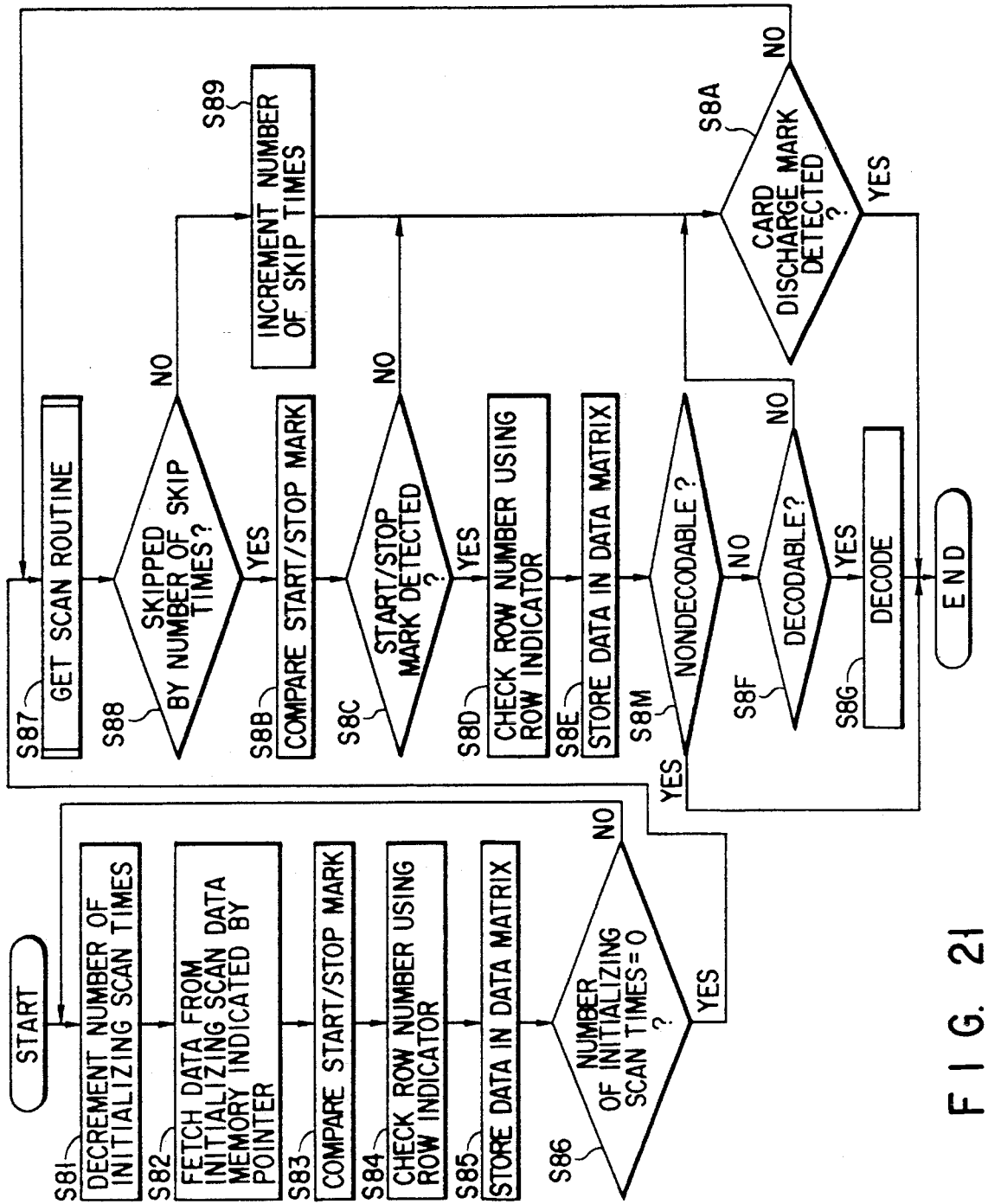
F I G. 21

| SECURITY LEVEL | NUMBER OF CORRECTABLE DATA CHARACTERS |
|---|---|
| 0 | 0 |
| 1 | 2 |
| 2 | 6 |
| 3 | 14 |
| 4 | 30 |
| 5 | 62 |
| 6 | 126 |
| 7 | 254 |
| 8 | 510 |

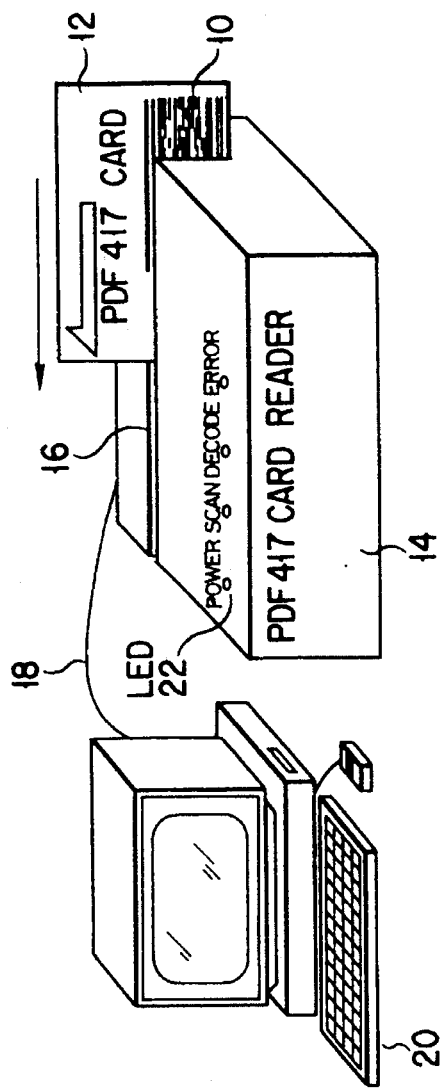
F I G. 24A
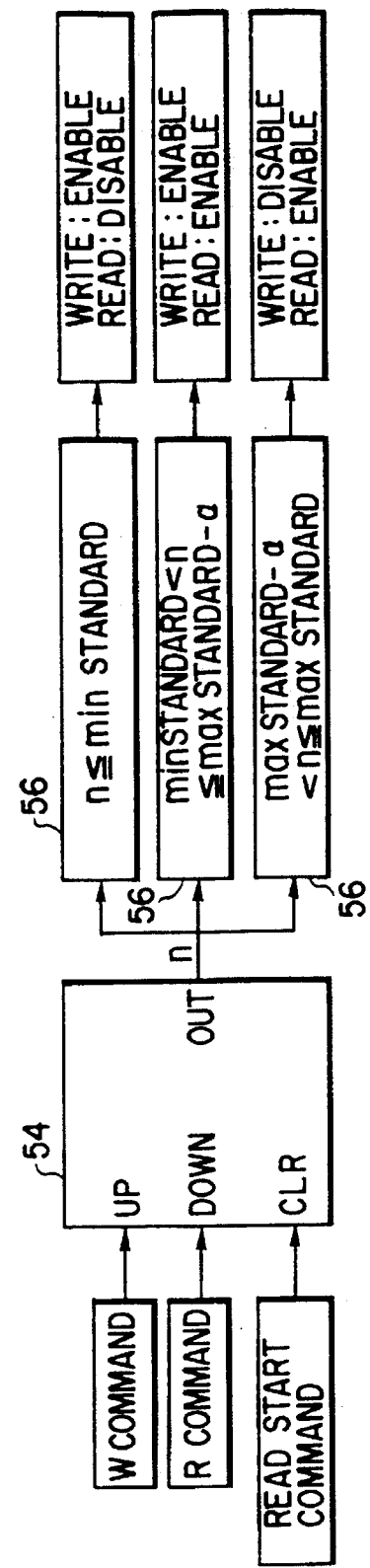
F I G. 24B

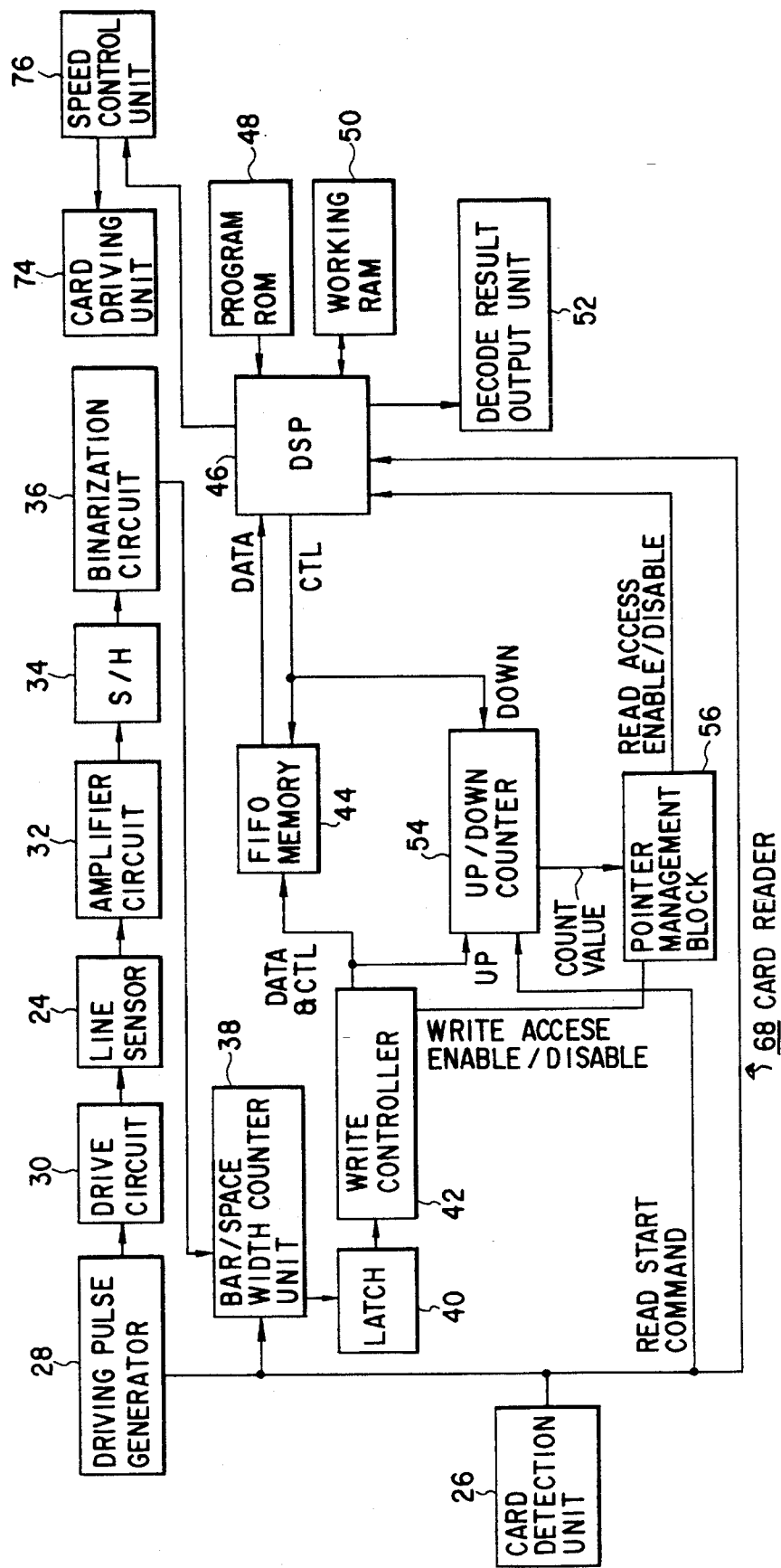
F I G. 28

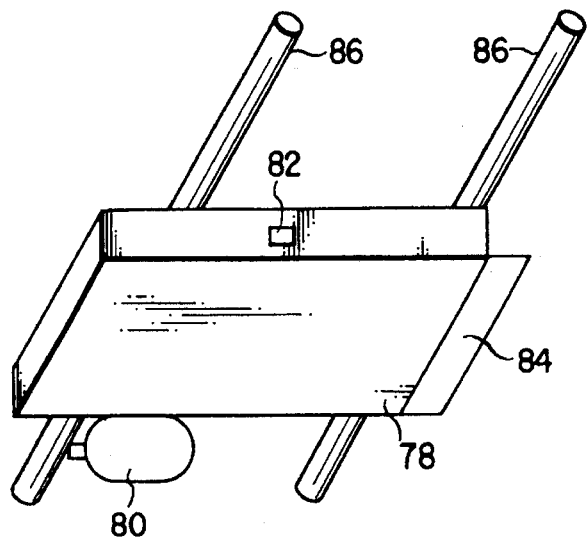
F I G. 29A
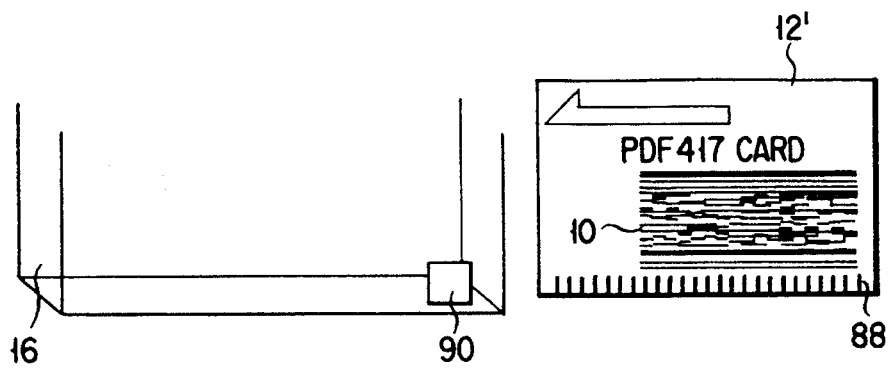
F I G. 29B

1

BARCODE SYMBOL READING SYSTEM CAPABLE OF SHORTENING TIME FOR READING AND DECODING

BACKGROUND OF THE INVENTION

1. Field of the Invention

The present invention generally relates to a barcode symbol reading system and, more particularly, to a barcode symbol reading apparatus capable of shortening the time required for reading and decoding by eliminating an unnecessary reading operation in a barcode symbol reading system for reading a barcode symbol from a recording medium on which a barcode symbol is recorded.

2. Description of the Related Art

In recent years, barcode symbols are adopted in many countries, and the number of types of barcode symbols is very large. As typical barcode symbols, JAN/UPC/EAN codes, ITF (interleaved 2 of 5) codes, CODE39, NW-7 codes, CODE128, and the like are known. Recently, in order to meet requirements for an increase in information volume and a decrease in adhesion area, two-dimensional barcode symbols which have a large information amount and a high recording density have begun to be proposed. As two-dimensional barcode symbols, CODE16K, CODE49, PDF417, DATA CODE, VERI CODE, SOFT STRIP, and the like are known. Of these barcode symbols, the CODE16K, CODE49, and PDF417 are called multiple-row barcode symbols since they have a pattern obtained by stacking conventional barcode symbols in multiple rows.

On the other hand, many types of apparatuses for reading the JAN/UPC/EAN codes, ITF (Interleaved 2 of 5) codes, CODE39, NW-7 codes, CODE128, and the like (called one-dimensional barcode symbols in contrast to the two-dimensional barcode symbols) have been proposed. As typical apparatuses, pen type, touch type, and laser type apparatuses are known. On the other hand, the number of types of apparatuses for reading the two-dimensional barcode symbols is small, and the reading technique therefor is not established yet.

However, the basic principle of a method of reading the two-dimensional barcode symbols is substantially the same as that of a conventional method of reading the one-dimensional barcode symbols. More specifically, light is irradiated from a light source onto a barcode symbol, light reflected by the barcode symbol is received by a light-receiving element in a reading apparatus, and the received light is converted into an electrical signal. The converted electrical signal is decoded by an electrical circuit constituted by a microcomputer, and the like, thus reading the barcode symbol.

In recent years, card-shaped media printed or adhered with barcode symbols such as a magnetic card, IC card, optical card, and the like, have begun to be used. It is expected that such barcode cards be quickly spread due to their high portability.

In general, a reading apparatus for a magnetic card or the like is called a swipe type card reader since it reads the recorded contents when a card is slid along a slit by an operator. Also, a so-called time card type apparatus which reads the contents when a card is inserted/removed into/from an insertion port of a card reader by an operator is known, and is generally called a dip type card reader. These swipe and dip type card readers are compact and inexpensive. For this reason, an apparatus for reading a card printed or adhered with a two-dimensional barcode symbol is also required to be compact and inexpensive.

As an apparatus for reading a barcode symbol printed or adhered onto a card-shaped medium, an apparatus described in Japanese Patent Application No. 5-57229 (corresponding to Japanese Patent KOKAI Publication No. 6-266881) by the same inventor that of the present invention is available. The barcode symbol reading apparatus described in Japanese Patent Application No. 5-57229 reads the contents of a barcode symbol using a linear sensor (1DCCD) array. This patent application describes in detail the swipe and dip type card readers, i.e., a method of converting a signal obtained from the linear sensor (1DCCD) array into a width data string by proper processing, and efficiently storing the converted width data string in a FIFO memory.

A card is swiped by an operator, and the swipe speed is not constant. Some operators swipe the card at high speed, while other operators swipe the card at low speed.

When a card is swiped at low speed, the number of scan times per row of a barcode symbol increases, and a large amount of an extra width data string is stored in the FIFO memory. Therefore, since the information amount to be processed increases, the processing time is prolonged, resulting in an unnecessarily long reading time of a barcode symbol. The barcode symbol reading apparatus described in Japanese Patent Application No. 5-57229 does not take any countermeasure against this problem.

As a barcode reader for reading and decoding a barcode symbol, various types of apparatuses are known. As reading means in these barcode readers, scanning means using a laser, image pickup means using a line or area sensor, and the like are popularly used.

More specifically, in the laser method, a laser beam spot is scanned on a barcode symbol, and the intensity of light reflected from a portion in the spot is time-serially detected. In the line or area sensor, a barcode symbol image is formed on the sensor using an optical system, and light amount information detected by elements of the sensor is serially read.

The time-serially detected or serially read data is stored in a memory device. For example, Jpn. Pat. Appln. KOKAI Publication No. 4-256085 adopts an arrangement, as shown in FIG. 30. In a barcode reading apparatus described in this reference, data read by a barcode detection unit 1 is stored in a data memory unit 2 using a first-in first-out (to be abbreviated as a FIFO hereinafter) memory, and a barcode data group is detected by a barcode recognition unit 3. The storage address of the barcode data group in the data memory unit 2 is stored in an address memory unit 4. In this case, since the data memory unit 2 comprises a FIFO memory, the address value corresponds to the number of clocks from a reset timing. A barcode decoding unit 5 reads out barcode data from the data memory unit 2 on the basis of the address stored in the address memory unit 4 and executes decoding processing.

A barcode reader using a line sensor can read a one-dimensional barcode symbol by scanning the line sensor. However, in order to read a two-dimensional barcode symbol, the scanning operation of the line sensor must be repeated while moving the line sensor or the barcode symbol in a direction perpendicular to the line sensor.

However, when the scanning operation of the line sensor is repeated while moving the line sensor or the barcode symbol in the direction perpendicular to the line sensor, if the moving speed is low or the scanning speed of the line sensor is high relative to the moving speed, data in an identical row is read a plurality of number of times, and is repetitively stored in the memory. Therefore, in this case, when read barcode information is to be decoded, unnecessary information is included, resulting in an increase in decoding time.

SUMMARY OF THE INVENTION

It is, therefore, an object of the present invention to provide a new and improved barcode symbol reading system in which a barcode symbol can be read within a short period of time by skipping a reading signal of a barcode symbol, in particular, a multiple-row barcode symbol in correspondence with the relative moving speed between, e.g., the barcode symbol and an image pickup element.

The present invention has been made in consideration of the above situation, and has as its another object to provide a barcode symbol reading system which can shorten the decoding time of barcode information without storing unnecessary information.

According to one aspect of the present invention, there is provided a barcode symbol reading apparatus comprising:

scan means for scanning a barcode symbol to be read, which is formed on a medium inserted in a predetermined direction at an arbitrary insertion speed, in a direction perpendicular to the predetermined direction so as to output a reading signal corresponding to the barcode symbol;

scan time detection means for detecting the number of times of scans which are performed by the scan means substantially in correspondence with the insertion speed of the medium on a predetermined portion of the barcode symbol on the basis of the reading signal output from the scan means;

skip time determination means for, when the number of times of scans on the predetermined portion of the barcode symbol, which is detected by the scan time detection means is larger than a predetermined number of times of scans, determining the number of times of skipping of the reading signal output from the scan means;

skip means for skipping the reading signal output from the scan means in accordance with the number of times of skipping determined by the skip time determination means so as to decrease a data amount of the reading signal output from the scan means; and decode means for decoding the barcode symbol to be read on the basis of the reading signal whose data amount is decreased by the skip means According to another aspect of the present invention, there is provided a barcode symbol reading apparatus comprising:

insertion means for inserting a medium on which a barcode symbol to be read is formed;

scan means for scanning the barcode symbol formed on the medium inserted by the insertion means;

memory means for storing a reading signal from the scan means;

speed detection means for detecting a moving speed of the medium inserted by the insertion means; and control means for controlling to write the reading signal from the scan means in the memory means on the basis of the moving speed of the medium detected by the speed detection means, so as to achieve a predetermined number of times of write accesses per row of the barcode symbol.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 4A is a block diagram of a data processing circuit in FIG. 1;

FIGS. 4B and 4C are views each showing the positional relationship between a barcode symbol arranged on a card and a 1DCCD array;

FIGS. 6A and 6B are views showing a difference in the number of scan times per row due to a difference in swipe speed of a card;

FIG. 6C is a block diagram of a data processing circuit according to the second embodiment of the present invention;

FIG. 16 is a flow chart showing a GET SCAN 3-1 routine in FIG. 15;

FIG. 17 is a flow chart showing a scan routine of the third embodiment;

FIGS. 20A and 20B are perspective views showing the outer appearances of systems using other barcode symbol reading apparatuses;

FIG. 21 is a flow chart showing a scan routine according to the fourth embodiment of the present invention;

FIG. 24A is a perspective view showing the outer appearance of a system to which the barcode reader of the sixth embodiment is applied;

FIG. 24B is a chart for explaining the detailed operation of pointer management;

FIG. 28 is a block diagram of the barcode reader of the seventh embodiment;

FIG. 29A is a perspective view showing the arrangement of a card driving unit;

FIG. 29B is a schematic view showing the arrangement of a speed detection unit according to the eighth embodiment of the present invention.

DETAILED DESCRIPTION OF THE PREFERRED EMBODIMENTS

Figure 1:
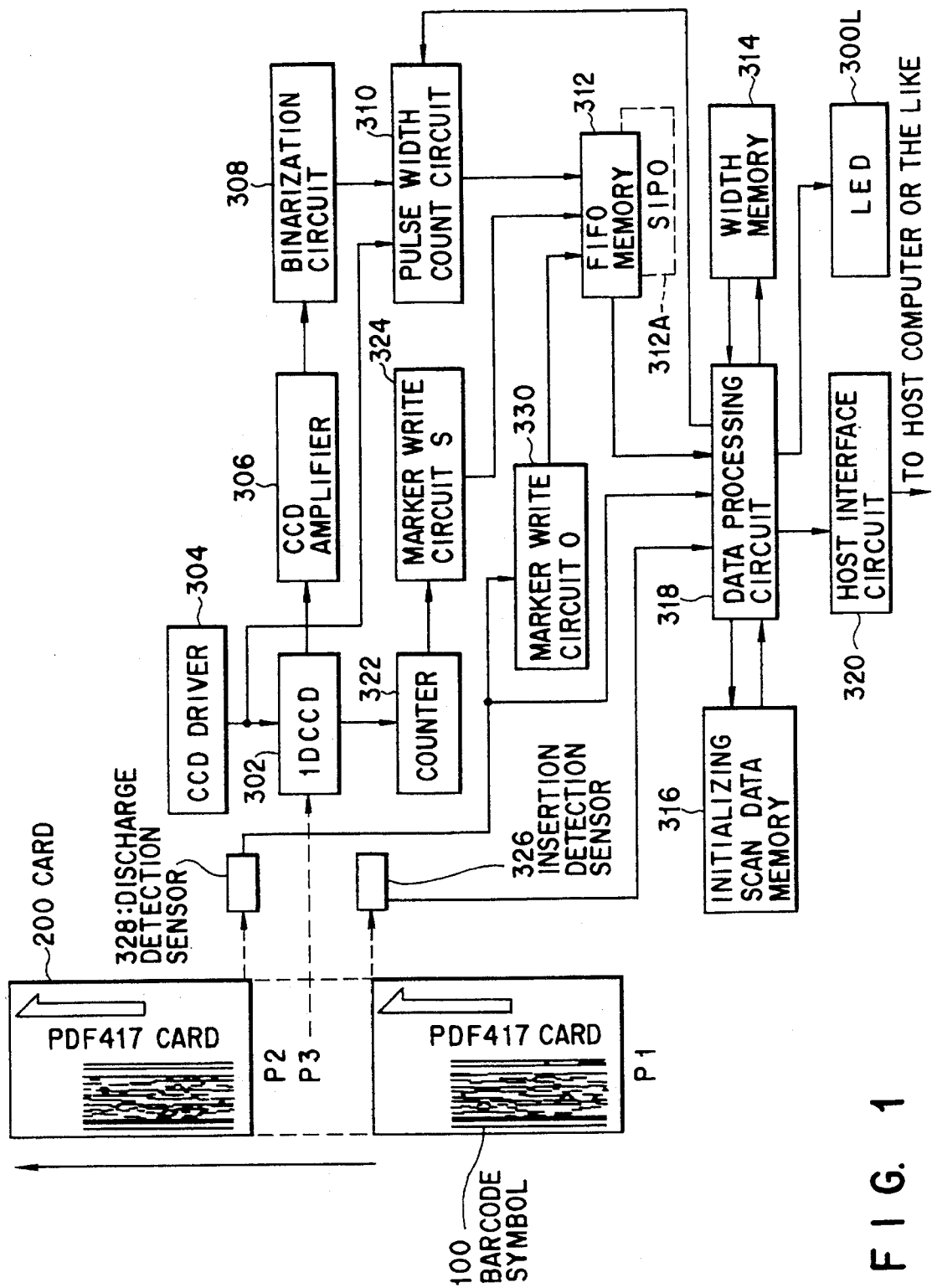
FIG. 1 is a block diagram showing a barcode symbol reading apparatus according to the first embodiment of the present invention.

Reference will now be made to the presently preferred embodiments of the invention as illustrated in the accompanying drawings, in which like reference characters designate like or corresponding parts throughout the several drawings.

The preferred embodiments of the present invention will be described hereinafter with reference to the accompanying drawings.

(First Embodiment)

Figure 2:
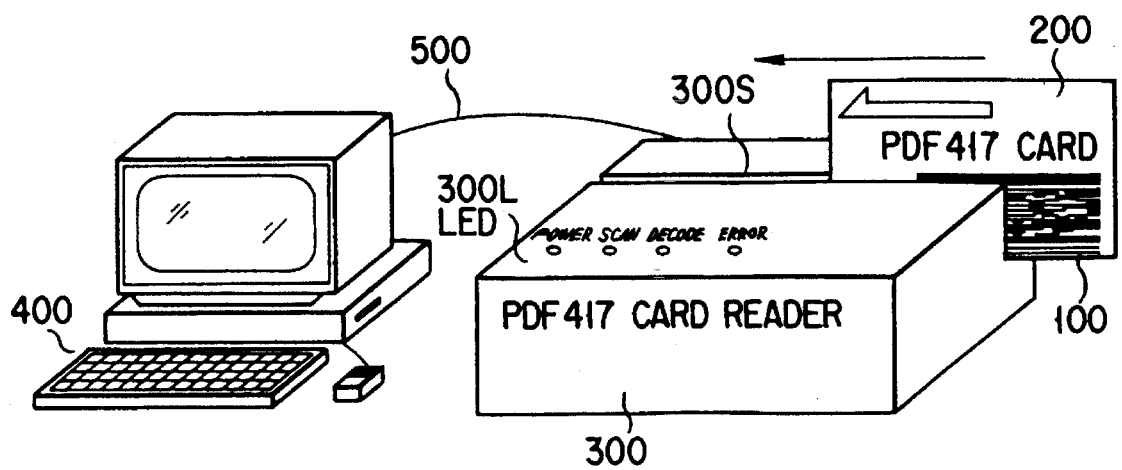
FIG. 2 is a perspective view showing the outer appearance of a system using the barcode symbol reading apparatus of the first embodiment.
Figure 3:
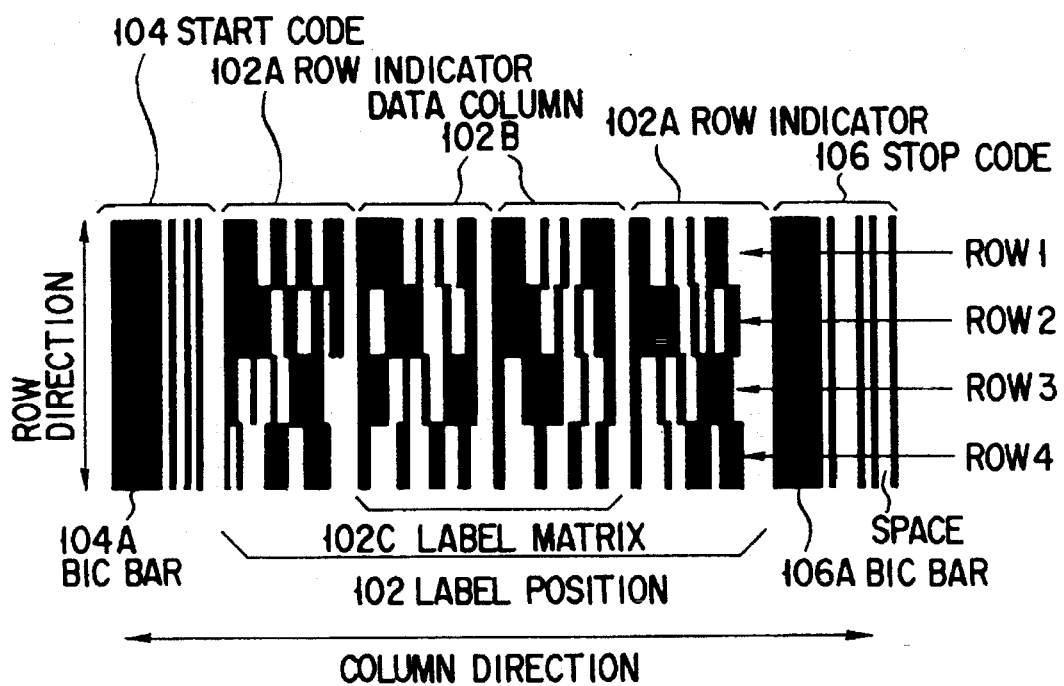
FIG. 3 is a view showing the format of a PDF417 symbol as an example of a two-dimensional barcode symbol to be read.

FIG. 1 is a block diagram showing a barcode symbol reading apparatus (to be referred to as a card reader hereinafter) according to the first embodiment of the present invention, FIG. 2 is a perspective view showing the outer appearance of a system using the card reader of the first embodiment, and FIG. 3 shows the format of a PDF417 barcode symbol as an example of a two-dimensional barcode symbol to be read by the reader.

A system using a card reader is constituted by a card 200 on which a barcode symbol 100 is printed or adhered, a card reader 300, a host computer 400, and a cable 500 for connecting the card reader 300 with the host computer 400, as shown in FIG. 2.

The card reader 300 reads the contents of the barcode symbol 100 when the card 200 is slid along a slit 300S in a direction of an arrow in FIG. 2, and transfers the recorded contents to the host computer 400 or a terminal apparatus (not shown). An electrical circuit having a block diagram shown in FIG. 1 is assembled in the card reader 300. Also, various light-emitting diodes (LEDs) 300L indicating the operation states of the card reader 300 are assembled in the card reader 300.

The card reader 300, which reads the recorded contents when the card 200 is manually slid along the slit 300S by an operator, is popularly known as a magnetic card reader, and the like, and is generally called a swipe type card reader.

The arrangement of the card reader 300 will be described below with reference to FIG. 1.

The card reader 300 reads the contents of the barcode symbol 100 using a (one-dimensional) linear sensor (1DCCD) array 302 comprising charge coupled devices (CCDs) as an image pickup device. More specifically, the card reader 300 comprises the 1DCCD array 302, a CCD driver 304, a CCD amplifier 306, a binarization circuit 308 for binarization, a pulse width count circuit 310, a first-in first-out (FIFO) memory 312, a width memory 314, an initializing scan data memory 316, a data processing circuit 318, a host interface circuit 320, a counter 322, a marker write circuit "S" 324, an insertion detection sensor 326, a discharge detection sensor 328, a marker write circuit "O" 330, and various LEDs 300L.

The CCD driver 304 supplies clock signals to the 1DCCD array 302 and the pulse width count circuit 310, and the CCD amplifier 306 amplifies an output from the 1DCCD array 302. The binarization circuit 308 binarizes the output from the CCD amplifier 306, and the pulse width count circuit 310 counts the widths of bars and spaces in the output signal from the binarization circuit 308 in synchronism with the clock signals supplied from the CCD driver 304.

The FIFO memory 312 stores width information counted by the pulse width count circuit 310. Since the contents of the FIFO memory 312 are sequentially read out by the data processing circuit 318, as will be described later, the FIFO memory 312 need not always have a capacity capable of storing all width information obtained by scanning the entire surface of the barcode symbol 100, but may have a capacity capable of all the width information, as a matter of course.

The width memory 314 stores width information for one scan (a single scan line obtained from the 1DCCD array 302) read out from the FIFO memory 312 as a data string (width data string). The initializing scan data memory 316 stores a width data string for each scan until the sizes in the row and column directions and the security level of a PDF417 barcode symbol (to be described later) are determined.

The data processing circuit 318 controls the processing of the entire card reader 300. As shown in FIG. 4A, the data processing circuit 318 comprises a high-speed calculation circuit 318A performing various types of processing to be described later, a width data counter 318B for counting the number of pieces of width information in a width data string for each scan, a threshold value register 318C for storing a certain value (threshold value) of width information in a width data string, a comparison circuit 318D for comparing the number of pieces of width information in a width data string in the width data counter 318B and a certain threshold value stored in the threshold value register 318C, a skip count register 318E for storing the number of width data strings to be skipped, a symbol size register 318F for storing the row and column numbers and security level of the barcode symbol 100 to be read, a scan time/row register 318G for counting the number of times of continuous scans of an identical row, and a data matrix 318J for storing data characters (to be described later) of the barcode symbol 100.

Referring to FIG. 1, the host interface circuit 320 is used for transferring the contents of the barcode symbol 100 to the host computer 400 in FIG. 2 or a terminal apparatus (not shown).

The counter 322 counts the number of pixel data of the 1DCCD array 302 which are supplied from the 1DCCD array 302 to the CCD amplifier 306. The marker write circuit 37 S" 324 receives the output from the counter 322, and outputs a special marker to be stored in the FIFO memory 312 in units of scans.

The insertion detection sensor 326 is used for detecting if the card 200 reaches the image pickup position of the 1DCCD array 302, and comprises a photointerrupter, and the like. The discharge detection sensor 328 is used for detecting if the card 200 exits from the image pickup position of the 1DCCD array 302, and comprises a photointerrupter, and the like. The marker write circuit "0" 330 receives the output from the discharge detection sensor 328, and outputs a special marker to be stored in the FIFO memory 312. On the basis of the outputs from the insertion detection sensor 326 and the discharge detection sensor 328, the data processing circuit 318 controls to operate the pulse width count circuit 310 while the card 200 is present at the image pickup position.

The LEDs 300L are used for indicating the operation states of the card reader 300.

The symbol structure of the barcode symbol 100 will be briefly described below. In this embodiment, a two-dimensional barcode symbol PDF417 is used as the barcode symbol 100. FIG. 3 shows the label structure of PDF417.

The barcode symbol 100 has a label portion 102 as an area of information components to be decoded consisting of barcode characters as a combination of bars and spaces, and start and stop codes 104 and 106 as start/stop characters respectively assigned before and after the label portion 102. One code consists of four bars and four spaces excluding the stop code 106. The stop code 106 consists of five bars and four spaces. The start and stop codes 104 and 106 respectively start with large bars 104A and 106A called "big bars".

The label portion 102 is constituted by codes called row indicators 102A assigned adjacent to the start and stop codes 104 and 106, and a label matrix 102C consisting of at least one data column 102B which is sandwiched between the row indicators 102A and describes actual data. A character consisting of four bars and four spaces in the data column 102B is called a data character. Note that the row indicator 102A assigned adjacent to the stop code 106 can be omitted, and the stop code 106 can be represented by only one bar. In the row indicator 102A, the size, in the row direction, of the label (the number of data columns 102B), the size in the column direction (the number of rows), the security level, and an address indicating the ordinal row position of the row indicator 102A are described. Note that the security level means the error correction performance level of the PDF417 barcode symbol. The PDF417 barcode symbol has nine levels, i.e., from security level 0 at which error correction is disabled to security level 8 at which error correction can be performed even when 510 data characters cannot be normally read.

Therefore, by decoding information of the row indicator 102A, the information size and the like of the barcode symbol 100 can be determined.

Note that FIG. 3 exemplifies a barcode symbol having a 4×2 label matrix (i.e., 4×2=8 data characters).

The relationship between the barcode symbol 100 and the 1DCCD array 302 shown in FIG. 1 will be explained below. The 1DCCD array 302 must be arranged, so that a data string obtained by a single scan includes the start and stop codes 104 and 106 of the barcode symbol 100. The barcode symbol 100 is arranged on the card 200, as shown in FIG. 4B or 4C. More specifically, FIG. 4B shows a case wherein the long sides of the card 200 are arranged parallel to the start and stop codes 104 and 106 of the barcode symbol 100. In this case, the card 200 is inserted in the card reader 300 in the direction of an arrow in FIG. 4B. Therefore, the 1DCCD array 302 in the card reader 300 is arranged perpendicularly to the start and stop codes 104 and 106 of the barcode symbol 100, as shown in FIG. 4B. On the other hand, FIG. 4C shows a case wherein the short sides of the card 200 are arranged parallel to the start and stop codes 104 and 106 of the barcode symbol 100. In this case, the card 200 is inserted in the card reader 300 in the direction of an arrow in FIG. 4C. Therefore, the 1DCCD array 302 in the card reader 300 is arranged perpendicularly to the start and stop codes 104 and 106 of the barcode symbol 100, as shown in FIG. 4C. Note that the positions of the start and stop codes 104 and 106 may replace each other in the cases shown in FIGS. 4B and 4C.

The operations of the respective units in the card reader 300 will be explained below with reference to FIG. 1 again.

When the insertion detection sensor 326 arranged near the image pickup position of the 1DCCD array 302 detects the card 200 (a position P1 in FIG. 1), the data processing circuit 318 (the high-speed calculation circuit 318A) recognizes this detection, and the card 200 including the barcode symbol 100 is illuminated with light emitted from an illumination device (not shown) in accordance with an instruction from the data processing circuit 318. Then, light reflected by the barcode symbol 100 becomes incident on the 1DCCD array 302 via an optical system including a lens and the like (not shown). At this time, the data processing circuit 318 starts the pulse width count circuit 310.

The 1DCCD array 302 converts an optical signal into an electrical signal, and outputs data for the number of pixels of the 1DCCD array 302 to the CCD amplifier 306 together with a synchronization signal. Scan data which is amplified by the CCD amplifier 306 and binarized by the binarization circuit 308 is input to the pulse width count circuit 310, and the widths of bars and spaces are counted in synchronism with the operation clocks of the 1DCCD array 302, which are supplied from the CCD driver 304. The width data are sequentially stored in the FIFO memory 312.

The counter 322 counts the number of pixel data output from the 1DCCD array 302 to the CCD amplifier 306. When the counter 322 has counted the pixels of the 1DCCD array 302, the marker write circuit "S" 324 outputs a value "00H" (H means hexadecimal notation) to be stored at the end of a width data string for each scan in the FIFO memory 312. The value "00H" is a value which does not exist in the width information of bars and spaces, and with this value, the data processing circuit 318 (the high-speed calculation circuit 318A) can determine the end of each scan (the end of a width data string for one scan).

Figure 5A:
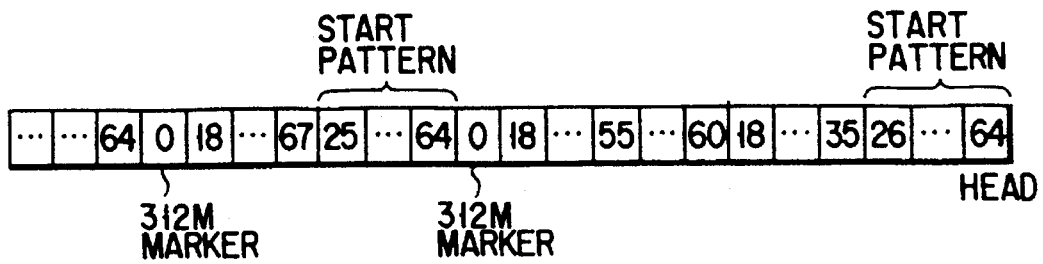
FIG. 5A is a map showing the contents of a FIFO memory in FIG. 1.

FIG. 5A shows the contents of the FIFO memory 312. More specifically, the contents start with a bar (or space) of a width "64", and this data is followed by a width data string of "10", "6", "10", "6", "10", "6", "26" (these data constitute a start pattern corresponding to the start code 104), "35", . . . , "25". Thereafter, "00H" (marker 312M) indicating the end of the width data string for this scan is stored. After "00H", a width data string for the next scan is stored. In practice, a pattern on the card 200 from the leading edge to the position before the barcode symbol 100 on the card 200 is stored in the FIFO memory 312 before the start pattern as initial data shown in FIG. 5A. However, for the sake of simplicity, FIG. 5A shows only an effective pattern.

Note that the number of pieces of width information in a width data string for each scan is unknown. More specifically, the size of the barcode symbol 100 to be read by the card reader 300 cannot be specified in advance when the card reader 300 is a versatile one, and the number of pieces of width information varies depending on the size of the barcode symbol 100. Even when the barcode symbols 100 with an identical size are to be scanned, a name, picture, sign, logo, characters, and the like are present on the card 200 in addition to the barcode symbol 100 printed or adhered thereon. If they are scanned together with the barcode symbol 100, the number of pieces of width information varies in units of scans. Also, the number of pieces of width information varies due to voids, spots, noise, and the like.

In this manner, since the number of pieces of width information in a width data string for each scan is unknown, a method of determining the maximum number of pieces of width information in a width data string for each scan in advance, and storing width data corresponding to the maximum number (if the number of pieces of stored information is short, the remaining area is filled with specific data), or a method of storing the number of pieces of stored information in units of scans in another memory are available. However, the former method of preparing a memory capacity in consideration of the maximum number of pieces of width information unnecessarily increases the memory capacity, and the latter method of storing the number of pieces of stored information in units of scans in another memory wastes the memory. Thus, in this embodiment, "00H", i.e., the marker 312M is stored at the end of a width data string for each scan. In this manner, a variable-length width data string for each scan can be efficiently stored in the memory, and the FIFO memory 312 can have a small capacity.

The data processing circuit 318 reads out the width data string up to "00H" from the FIFO memory 312, and stores the readout data in the width memory 314. Thereafter, the data processing circuit 318 reads out the contents of the width memory 314. The data processing circuit 318 repeats this operation, and reads the contents of the barcode symbol 100 on the card 200 while detecting the sizes in the row and column direction and security level using the initializing scan data memory 316 having a storage structure shown in FIG. 5B. When the barcode symbol 100 is normally decoded, the data processing circuit 318 controls the host interface circuit 320 to transfer the decoded contents to the host computer 400 in FIG. 2 or a terminal apparatus (not shown).

In this case, data read out from the FIFO memory 312 is temporarily stored in the width memory 314 since a width data string may be processed from the beginning of data and may be stored in the data matrix 318J (to be described later) in some cases, or may be processed from the end of data and may be stored in the data matrix 318J in some other cases. For example, when the start code 104 present in a leading end portion of a width data string cannot be detected and the stop code 106 present in a trailing end portion is detected, the width data string is processed from the end of the data toward the beginning of the data.

Upon detection of the sizes in the row and column direction and security level using the row indicator 102A, the data processing circuit 318 counts the number of times of appearance of an identical row indicator 102A. More specifically, this count value corresponds to the number of scan times per row. By using number of scan times per row, an extra width data string can be prevented from being processed after the sizes in the row and column direction and security level are determined.

When an operator swipes the card 200 (slides it along the slit 300S) at low speed, the number of scan times per row increases. For example, FIG. 6A shows a case of 3 scans/row. However, when the card is swiped at lower speed, the number of scan times per row increases to 5 scans/row, as shown in FIG. 6B. Therefore, the amount of a width data string to be stored in the FIFO memory 312 also increases, and the time required for reading the barcode symbol 100 is prolonged. In this embodiment, as will be described in detail later, using the above-mentioned number of scan times per row, an extra width data string can be prevented from being processed after the sizes in the row and column directions and security level are determined. Therefore, even when an operator carefully swipes the card 200 to reliably read the barcode symbol 100, processing can be executed without prolonging the reading time.

When the discharge detection sensor 328 arranged near the image pickup position of the 1DCCD array 302 detects passage of the card 200 (a position P2 in FIG. 1), the discharge detection sensor 328 outputs a signal for informing this detection to the data processing circuit 318 and also to the marker write circuit "O" 330. In accordance with this signal, the data processing circuit 318 stops the operation of the pulse width count circuit 310.

On the other hand, the marker write circuit "O" 330 stores a special mark in the FIFO memory 312 upon discharge of the card indicated by the above-mentioned signal. Therefore, the data processing circuit 318 detects the special mark from the FIFO memory 312 and can confirm that the card 200 has been discharged. Of course, the data processing circuit 318 can confirm discharge of the card 200 based on the output from the discharge detection sensor 328. However, when the data processing circuit 318 cannot process the width data string of the FIFO memory 312 in real time, i.e., when a non-processed width data string still remains in the FIFO memory 312 at the time of confirmation of discharge of the card 200 based on the output from the discharge detection sensor 328, the data processing circuit 318 cannot determine the current data processing position. For this reason, the special mark indicating the discharge timing is prepared. The special mark indicating the discharge timing must have a value which does not exist in information obtained by counting the widths of bars and spaces (e.g., if the number of pixels of the 1DCCD array 302 is 2,048, a value "2100" which does not exist in barcode information may be used as a special mark indicating the discharge timing; in this case, the FIFO memory 312 must have an arrangement of 12 bits or more). With this mark, the data processing circuit 318 can determine the card discharge timing.

The data processing circuit 318 also controls the LEDs 300L indicating the operation states of the card reader 300. The LEDs 300L shown in FIG. 2 include a POWER LED indicating that a power supply voltage is supplied to the card reader 300, a SCAN LED indicating that the 1DCCD array 302 is scanning the barcode symbol 100 on the card 200, a DECODE LED indicating that the contents of the barcode symbol 100 were normally decoded, and an ERROR LED indicating that the contents of the barcode symbol 100 were not decoded.

The data processing circuit 318 decodes the contents of the barcode symbol 100 on the basis of an algorithm to be described below, and transfers the decoded result to the host computer 400 in FIG. 2 or a terminal apparatus (not shown).

Figure 7:
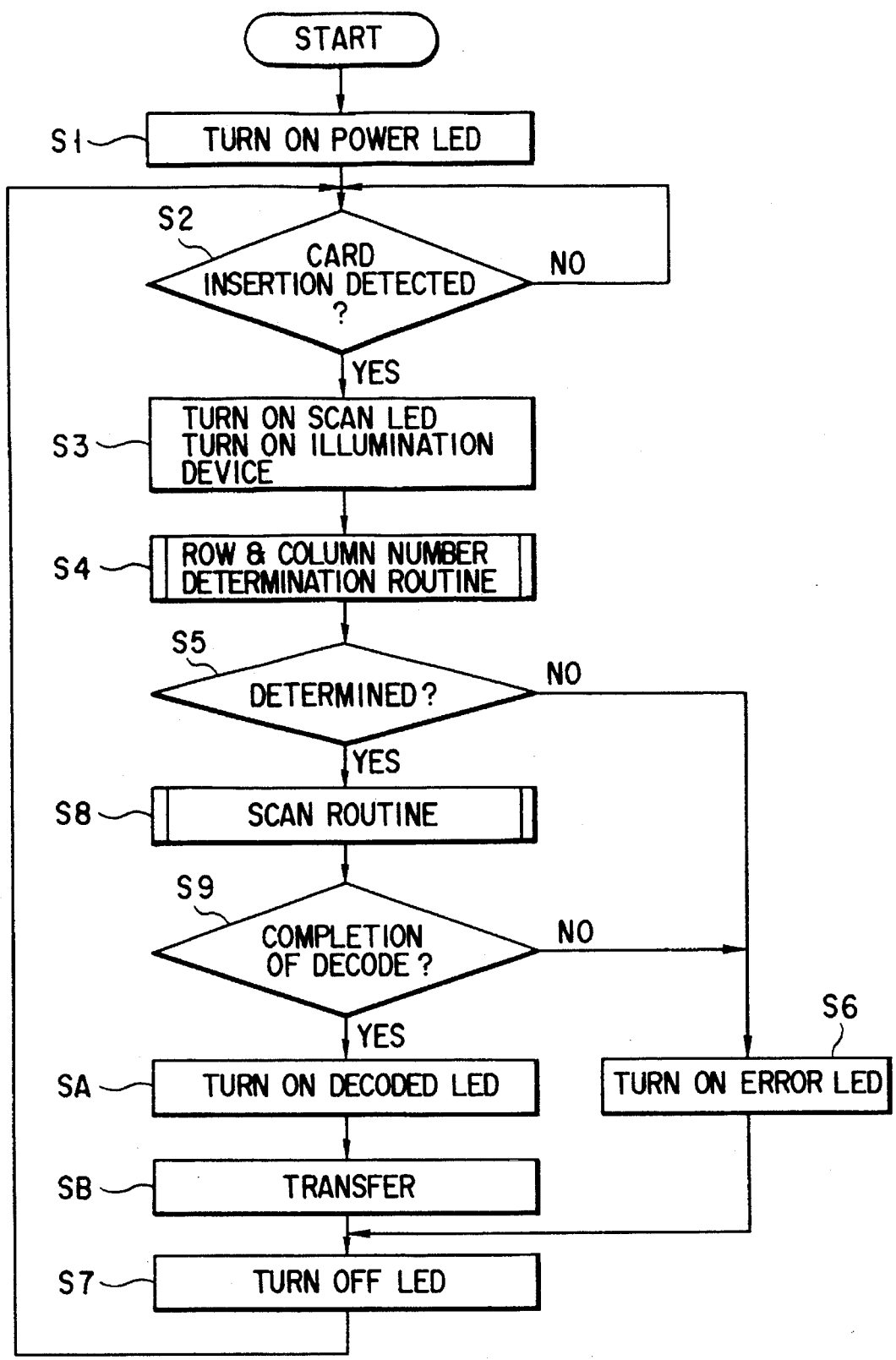
FIG. 7 is a schematic flow chart showing an algorithm for decoding the contents of a barcode symbol using the data processing circuit shown in FIG. 4A.

FIG. 7 is a schematic flow chart showing an algorithm for detecting the contents of the barcode symbol 100 by the data processing circuit 318 in the swipe type card reader.

When the power switch of the card reader 300 is turned on, and the data processing circuits 318 starts its operation, the POWER LED is turned on (step S1), and it is checked if the card 200 is inserted (step S2). If NO in step S2, step S2 is repeated again.

On the other hand, if YES in step S2, the SCAN LED and an illumination device (not shown) are turned on, and the pulse width count circuit 310 is started (step S3). Thereafter, a row number & column number determination routine (to be described in detail later) is called (step S4) to read the row indicators 102A of the barcode symbol 100, thereby determining the label size, security level, and the like of the barcode symbol 100.

It is checked if the label size, security level, and the like are determined in the row number & column number determination routine in step S4 (step S5). If NO in step S5, the ERROR LED is turned on (step S6), LEDs other than the POWER LED are turned off (step S7), and the flow returns to step S2 to wait for insertion of the card.

On the other hand, if YES in step S5, a scan routine (to be described later) is called (step S8) to sequentially scan the barcode symbol 100 using the 1DCCD array 302, thereby reading the barcode symbol 100.

It is then checked if the decoding is completed in the scan routine in step S8 (step S9). If NO in step S9, the ERROR LED is turned on (step S6), LEDs other than the POWER LED are turned off (step S7), and the flow returns to step S2 to wait for insertion of the card.

On the other hand, if YES in step S9, the DECODE LED is turned on (step SA), and the contents of the barcode symbol 100 are transferred to the host computer 400 in FIG. 2 or a terminal apparatus (not shown) by controlling the host interface circuit 320 (step SB). Thereafter, LEDs other than the POWER LED are turned off (step S7), and the flow returns to step S2 to wait for insertion of the card.

The operation of the row number & column number determination routine called in step S4 will be described in detail below with reference to FIG. 8.

First, an initializing scan time counter which is allocated in the initializing scan data memory 316 and indicates the number of scan times required for determining the row number and the column number, and the scan time/row register 318G in the data processing circuit 318 are cleared (step S41). Then, a GET SCAN routine (to be described later) is called (step S42), and a width data string for one scan, which is supplied from the 1DCCD array 302 and is stored in the FIFO memory 312 via the pulse width count circuit 310, is stored in the width memory 314.

The width data string is sequentially read out from the width memory 314, and it is checked if the start or stop code 104 or 106 is detected from the width data string (step S43). If NO in step S44, it is checked if a card discharge mark is included in the width data string (step S45). If YES in step S45, the row number & column number determination routine ends; otherwise, the flow returns to the GET SCAN routine in step S42.

If the start or stop code 104 or 106 is detected in step S44, the width data string is stored in the initializing scan data memory 316 (step S46), and the start address of an area for storing the next width data string in the initializing scan data memory 316 is written in an area called a pointer indicating the start address of each width data string (step S47).

Furthermore, the contents of the initializing scan time counter are incremented (step S48).

Figure 5B:
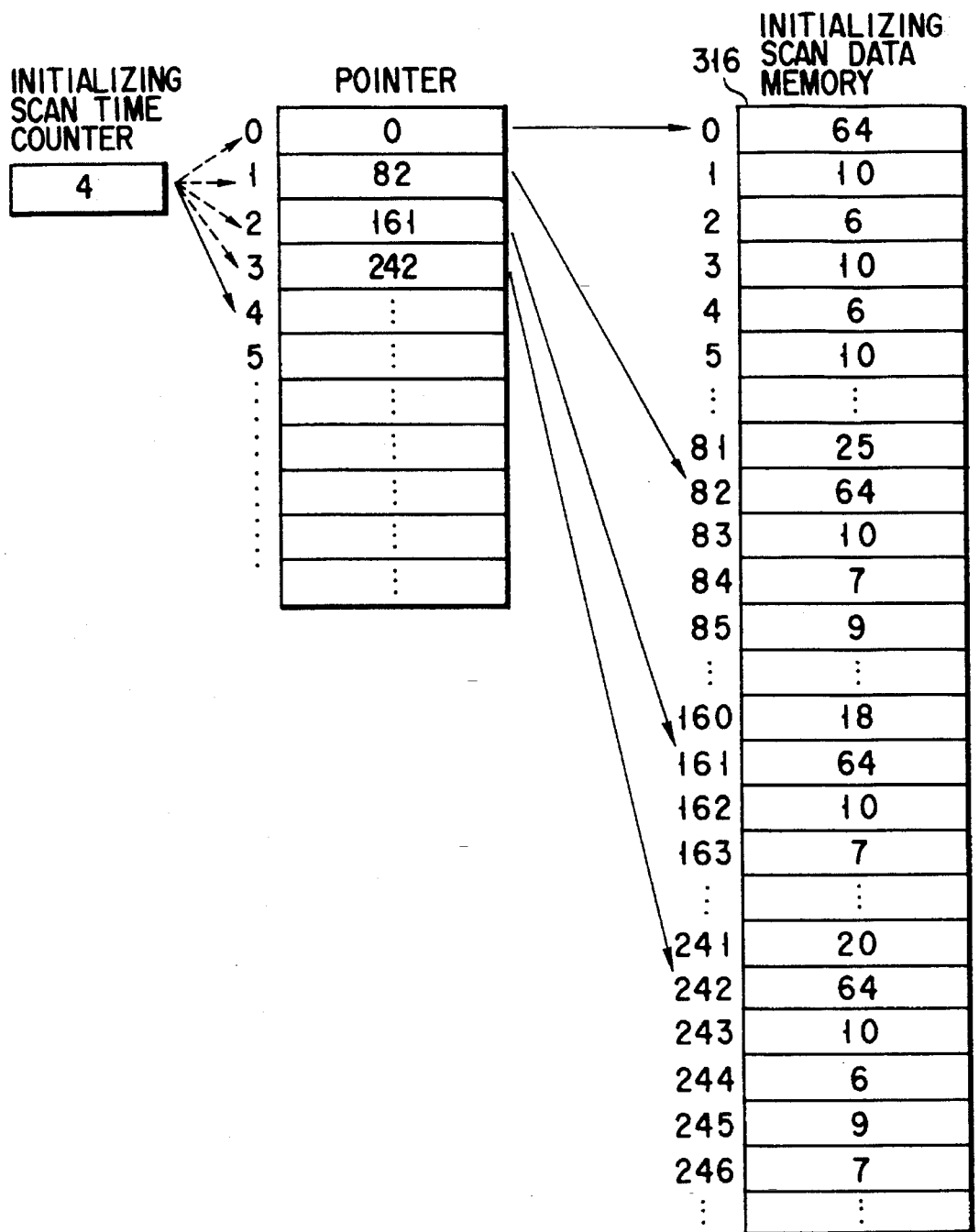
FIG. 5B is a map for explaining the storage architecture of an initializing scan data memory in FIG. 1.

FIG. 5B shows the storage structure of the initializing scan data memory 316. The initializing scan data memory 316 sequentially stores a width data string from which the start or stop code 104 or 106 is detected, and the pointer indicating the start address of a width data string for each scan and the initializing scan time counter are independently prepared. The pointer and the initializing scan time counter may be allocated in another memory in place of the initializing scan data memory 316.

Thereafter, the row indicator 102A located adjacent to the detected start code 104 (or the stop code 106) is read (step S49), and the contents of the scan time/row register 318G are incremented (step S4A) so as to count the number of times of continuous reading of an identical row indicator 102A, i.e., an identical row. In this case, the number of times of continuous reading of the first row in the barcode symbol 100 can be counted.

The row number, column number, and security level of the barcode symbol 100 are confirmed from the read row indicator 102A (step S4B), and the confirmed values are sequentially stored in the symbol size register 318F in the data processing circuit 318.

The row number, column number, and security level cannot be confirmed by the row indicator 102A of one row, and at least three row indicators 102A are required to confirm them. It is checked if the row number, column number, and security level are determined (step S4C). If YES in step S4C, the number of skip times of a width data string is determined on the basis of the number of scan times per row counted in step S4A (step S4D), and is stored in the skip count register 318E in the data processing circuit 318, thus ending the row number & column number determination routine.

On the other hand, if NO in step S4C, the flow advances to step S45 to check if a card discharge mark is present in the width data string. If YES in step S45, the row number & column number determination routine ends; otherwise, the flow returns to the GET SCAN routine in step S42.

A method of determining the number of skip times of a width data string in step S4D will be explained below. For example, if the number of scan times per row counted in step S4A is 6 scans/row (i.e., the first row of the barcode symbol 100 is continuously read six times), the number of skip times is set to be 1 (every other width data strings are used/ skipped); if the number of scan times per row is 9 scans/row, the number of skip times is set to be 2. This is because 3 scans per row are required to read the barcode symbol 100. Therefore, the number of skip times can be properly determined by:

The number of skip times=[|(the number of scan times per row)− 3|/3]

(where | | means calculation of an absolute value, and [ ] means rounding off of a number into an integer by truncating)

The operation of the scan routine called in step S8 will be described in detail below with reference to FIG. 9.

First, the number of initializing scan times obtained in the row number & column number determination routine in step S4 is decremented (step S81). A width data string for one scan is read out from the initializing scan data memory 316 indicated by the pointer located at the position of the number of initializing scan times (step S82). In this case, the end of a width data string can be determined from the immediately preceding pointer.

Thereafter, the start or stop code 104 or 106 is confirmed from the width data string (step S83). In this case, it has already been confirmed in the row number & column number determination routine in step S4 that the start or stop code 104 or 106 is included in the width data string. Thereafter, the row indicator 102A adjacent to the detected start code 104 (or the stop code 106) is read to confirm the row number of the scanned width data string (step S84). The row indicator 102A describes an address indicating the ordinal row position of the scan data.

Data characters after the row indicator 102A are sequentially stored in the data matrix 318J (to be described later) in the data processing circuit 318 from the confirmed row number position (step S85). When the start code 104 can be detected first, the first data character immediately after the row indicator 102A is stored at the left end position in the data matrix 318J, and processed width data are sequentially stored to the right. This operation is repeated to the end of the width data string for one scan. If the stop code 106 is detected first, the first data character is stored at the right end position in the data matrix 318J, and processed width data are sequentially stored to the left.

It is checked if the number of initializing scan times is "0" (step S86). If NO in step S86, since a non-processed width data string still remains in the initializing scan data memory 316, the flow returns to step S81.

However, if YES in step S86, the GET SCAN routine (to be described in detail later) is called to process a new width data string (step S87). It is checked if the data reading operation is skipped a number of times corresponding to the contents of the skip count register 318E in the data processing circuit 318, which are determined in the row number & column number determination routine in step S4 (step S88). If NO in step S88, the number of skipped times is incremented (step S89), and it is checked if the read width data string includes a special mark indicating discharge of the card (step S8A). If YES in step S8A, the scan routine ends; otherwise, the flow returns to step S87.

On the other hand, if YES in step S88, the start or stop code 104 or 106 is confirmed from the width data string read out in step S87 (step S8B). If the width data string includes neither the start code 104 nor the stop code 106 (step S8C), the flow advances to step S8A to check if the read width data string includes a special mark indicating discharge of the card. If YES in step S8A, the scan routine ends; otherwise, the flow returns to step S87.

If it is determined in step S8C that the start or stop code 104 or 106 is included in the width data string, the row indicator 102A adjacent to the detected start code 104 (or the stop code 106) is read to confirm the row number of the scanned width data string (step S8D). Data characters after the row indicator 102A are sequentially stored in the data matrix 318J (to be described later) in the data processing circuit 318 from the confirmed row number position (step S8E).

It is checked if information read so far is decodable (step S8F). If YES in step S8F, the flow advances to decode processing in step S8G. Note that "decodable" corresponds to a case wherein the number of data characters which are not stored in the data matrix 318J (to be described later) is smaller than the number of error-correctable characters if error correction is performed, and corresponds to a case wherein all the data characters are stored in the data matrix 318J if error correction is not performed.

If it is determined in step S8F that information is nondecodable, the flow advances to step S8A to check if the read width data string includes a special mark indicating discharge of the card. If YES in step S8A, the scan routine ends; otherwise, the flow returns to step S87. Note that the "nondecodable" corresponds to a case wherein the number of data characters which are not stored in the data matrix 318J (to be described later) is larger than the number of error-correctable characters if error correction is performed, and corresponds to a case wherein data characters which are not stored in the data matrix 318J are present if error correction is not performed. It is very important for shortening the decode time to perform a decodable checking operation in units of scans in place of scanning of the entire surface of the card 200.

In step S8G, information read in the scan routine so far is checked. This checking operation is performed for data characters stored in the data matrix 318J (to be described later). In this case, the decode result may be simply confirmed (conventional one-dimensional barcode symbols such as JAN/UPC/EAN code, ITF (interleaved 2 of 5) code, CODE39, NW-7 code, CODE128, and the like), or error correction may be performed (two-dimensional barcode symbols such as PDF417, DATA CODE, and the like). After execution of step S8G, the scan routine ends.

The data matrix 318J in the data processing circuit 318 will be described below. The data matrix 318J is a matrix for storing data characters whose values are obtained from the scanned width data string. In the case of the JAN/UPC/EAN code, a value ranging from "0" to "9" is stored, and in the case of the PDF417, a value ranging from "0" to "928" is stored. In the case of the PDF417, the size of the data matrix 318J is the same as that of the label matrix 102C in the barcode symbol 100 on the card 200. In a method of obtaining a data character from the width data string, in, e.g., the JAN/UPC/EAN code, a total of four width data, i.e., two black bars and two white spaces are converted into a value ranging from "0" to "9". This conversion is normally attained using a look-up table. In the case of the PDF417, a total of eight width data including four black bars and four white spaces are converted into a value ranging from "0" to "928". Also, this conversion is normally attained using a look-up table.

Figure 10:
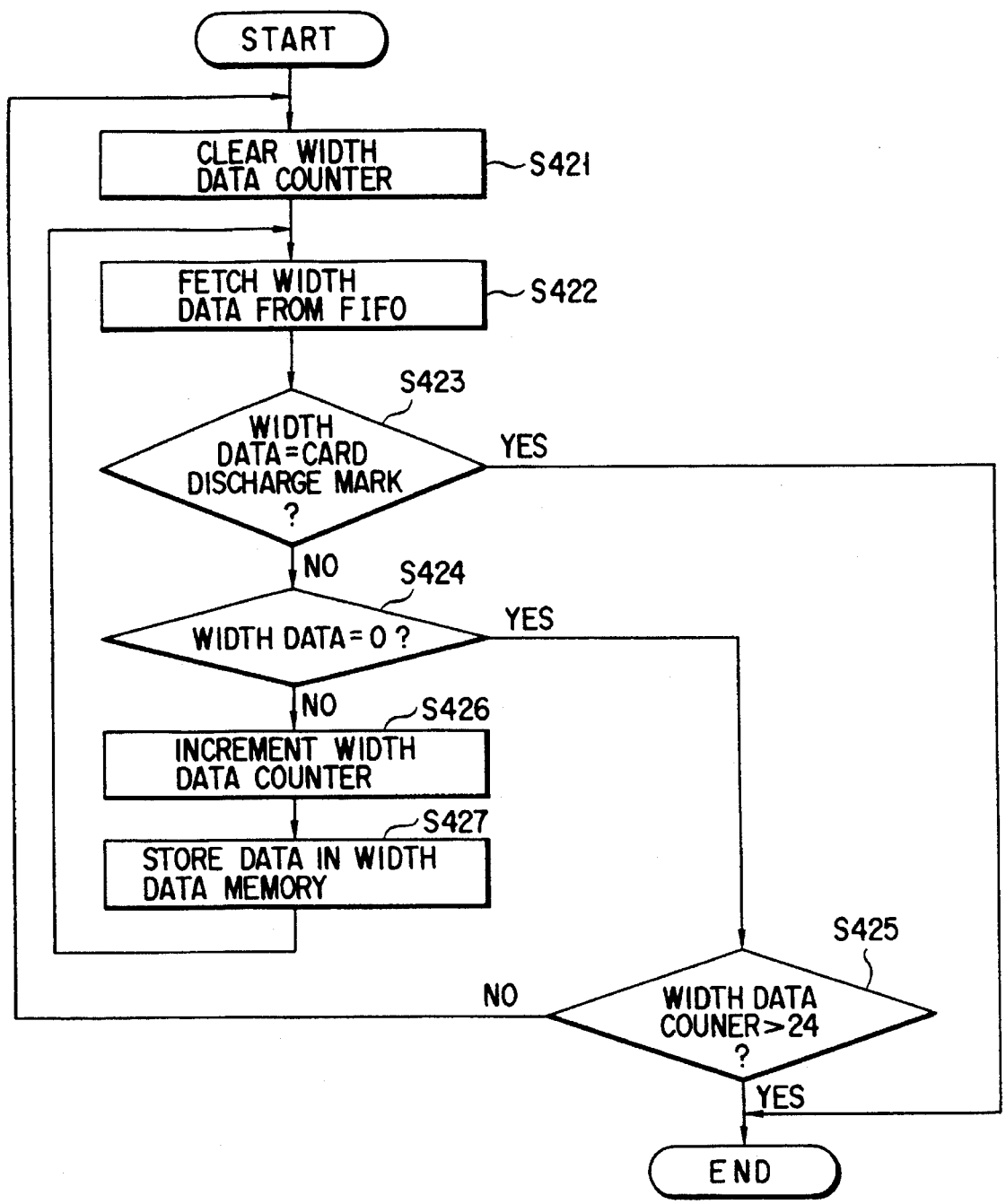
FIG. 10 is a flow chart showing a GET SCAN routine in FIG. 8.

The operation of the GET SCAN routine called in steps S42 and S87 will be described in detail below with reference to FIG. 10.

The high-speed calculation circuit 318A clears the width data counter 318B for counting the number of pieces of width information in a width data string for each scan (step S421). Width data is fetched from the FIFO memory 312 which stores width data from the 1DCCD array 302 (step S422). It is checked if the fetched width data is a special mark indicating discharge of the card (step S423). If YES in step S423, the GET SCAN routine ends; otherwise, it is checked if the fetched width data is "00H" indicating the end of a width data string for one scan (step S424). If YES in step S424, it is checked using the comparison circuit 318D if the value of the width data counter 318B is larger than a certain threshold value stored (to be described later) in the threshold value register 318C (step S425). If YES in step S425, the GET SCAN routine ends; otherwise, the flow returns to step S421.

On the other hand, if NO in step S424, the contents of the width data counter 318B are incremented (step S426), and the fetched width data is stored in the width memory 314 (step S427). The flow then returns to step S422.

The threshold value to be compared with the value of the width data counter 318B will be described below. The row indicator 102A adjacent to the stop code 106 can be omitted, and the stop code 106 can be represented by only one bar.

For this reason, minimum elements constituting the PDF417 barcode symbol are a start code 104, a row indicator 102A, a single data column 102B, and a simple stop code (only one bar). More specifically, the number of pieces of width information is a total of 25, i.e., eight pieces of information (four bars and four spaces) in the start code 104, eight pieces of information (four bars and four spaces) in the row indicator 102A, eight pieces of information (four bars and four spaces) in the data column 102B, and one information (one bar) in the simple stop code. Therefore, if the number of pieces of width information is equal to or smaller than 24, the scanned data string can be ignored. For this reason, the threshold value can be set to be "24".

In this manner, when a scan having a number of width data equal to smaller than the threshold value is ignored, the start and stop codes 104 and 106 can be prevented from being searched for from a width data string obtained by scanning other portions, including characters, photograph, illustration, and space, on the card, and can also be prevented from being searched for from a width data string (which cannot be normally scanned due to a defect) which includes neither the row indicator 102A nor the data column 102B, resulting in high-speed processing. In addition, the data processing circuit 318 need not be constituted by expensive electrical elements which can perform high-speed processing, and an inexpensive barcode symbol reading apparatus can be provided.

Figure 8:
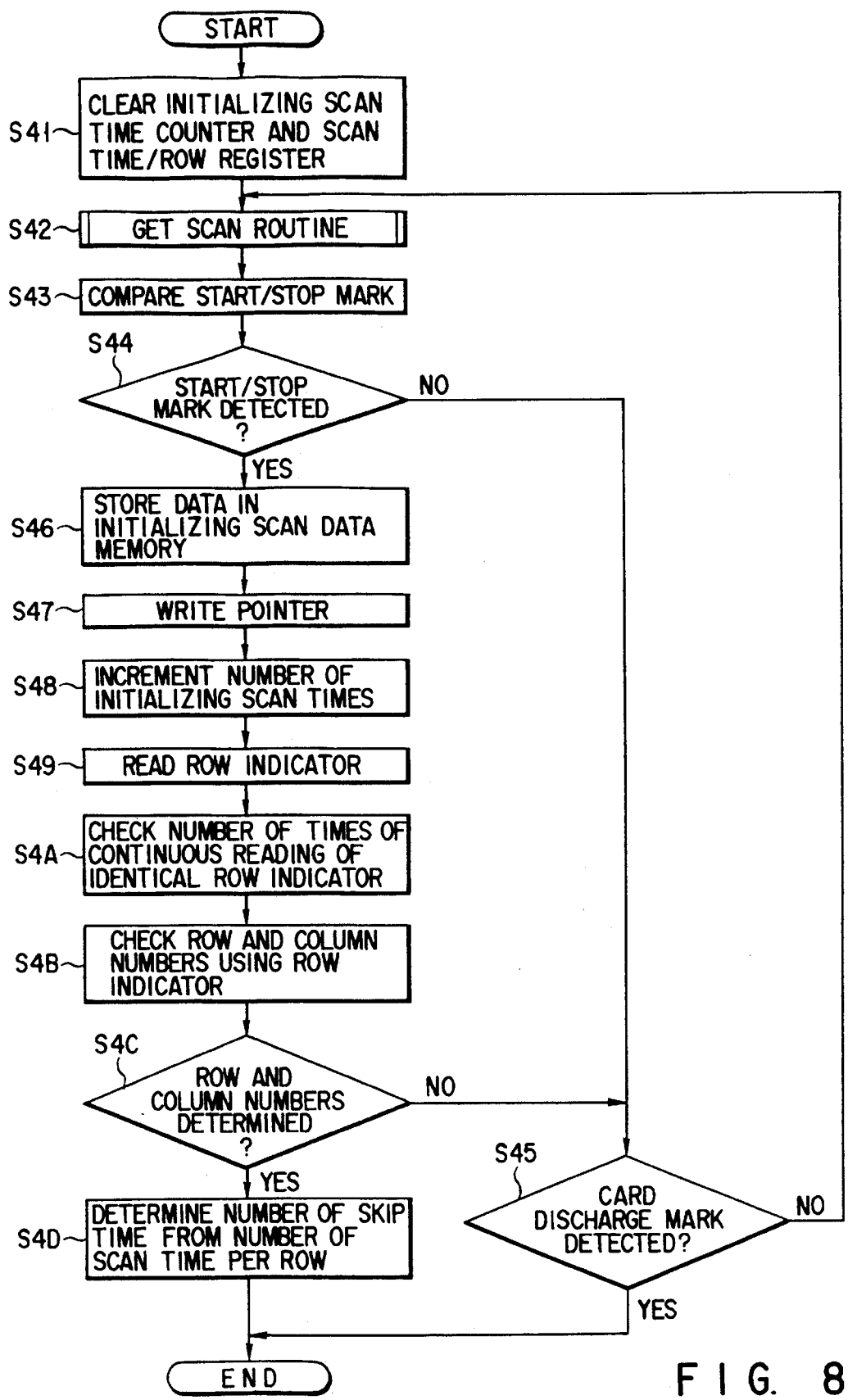
FIG. 8 is a flow chart showing a row number & column number determination routine in FIG. 7.

In the above description, upon determination of the number of scan times per row in step S4A in FIG. 8, the number of times of continuous reading of the first row of the barcode symbol 100 is counted. Alternatively, a total number of scan times of a plurality of first rows (e.g., two rows) may be averaged.

Figure 9:
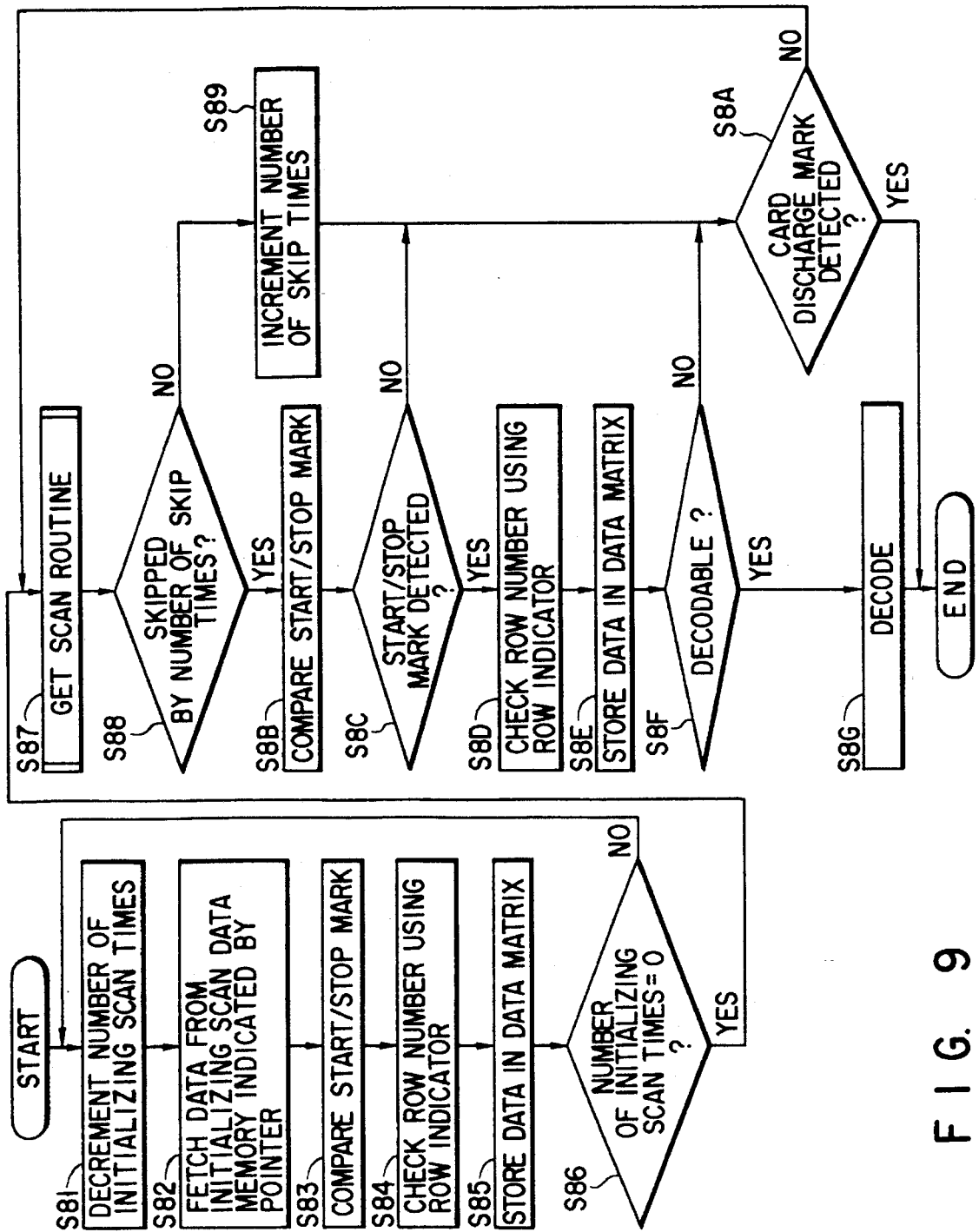
FIG. 9 is a flow chart showing a scan routine in FIG. 7.

In step S8E in FIG. 9, data characters after the row indicator 102A are sequentially stored in the data matrix 318J from the confirmed row number position. At this time, the number of storage times of data characters having an identical row number in the data matrix 318J may be discriminated. More specifically, the number of times of continuous reading of data characters in a single row may be confirmed to determine the number of scan times per row, and to determine the number of skip times of a width data string.

Alternatively, the number of scan times may be determined in advance, the number of scan times per row may be determined by checking the number of scanned rows in the number of times of scans, and the number of scan times of a width data string may be determined.

In general, it is difficult for an operator to slide, e.g., swipe the card 200 along the slit 300S of the card reader 300 at a constant speed. Therefore, it is effective to confirm the number of scan times per row during storage of data in the data matrix 318J and to change the number of skip times of a width data string.

(Second Embodiment)

The second embodiment of the present invention will be described below.

A barcode symbol reading apparatus (to be also referred to as a card reader hereinafter) of the second embodiment reads the contents of a barcode symbol 100 using a linear sensor 1DCCD array 302 comprising charge-coupled devices (CCDs). The only arrangement different from that in the first embodiment will be described below. FIG. 6C is a block diagram showing the arrangement of a data processing circuit 332, and the same reference numerals in FIG. 6C denote the same parts as in FIG. 4A.

More specifically, in this embodiment, a noneffective scan time counter 332H is arranged in the data processing circuit 332 to store the number of scan times from when the insertion of the card 200 is detected by the insertion detection sensor 326 until the leading end of the card 200 actually reaches the image pickup position (a position P3 in FIG. 1) of the 1DCCD array 302. Therefore, in this embodiment, the insertion detection sensor 326 is used not for detecting if the card 200 reaches the image pickup position of the 1DCCD array 302 but for detecting if the card 200 is inserted in the card reader 300.

Note that the moving distance of the card 200 from when the insertion detection sensor 326 detects the card 200 until the card 200 actually reaches the image pickup position of the 1DCCD array 302 is determined in design of the card reader 300. Therefore, the moving speed of the card 200 is detected based on the value of the noneffective scan time counter 332H. Based on the moving speed, the number of skip times of a width data string is determined.

More specifically, in the first embodiment described above, the number of times of continuous reading of an identical row indicator is confirmed in the row number & column number determination routine so as to determine the number of scan times per row and to determine the number of skip times of a width data string. However, in the second embodiment, the moving speed of the card 200 is detected on the basis of the number of scan times from detection of insertion of the card 200 until the card reaches the image pickup position of the 1DCCD array 302, that is, the relative moving speed between the barcode symbol 100 and the 1DCCD array 302 is detected, thereby determining the number of skip times of a width data string.

A reading algorithm will be described below. The schematic flow chart of the algorithm for decoding the contents of the barcode symbol 100 is the same as that shown in FIG. 7 in the first embodiment, and the flow chart of the scan routine is the same as that shown in FIG. 9 in the first embodiment. Therefore, only a portion different from the first embodiment will be described below.

Figure 11:
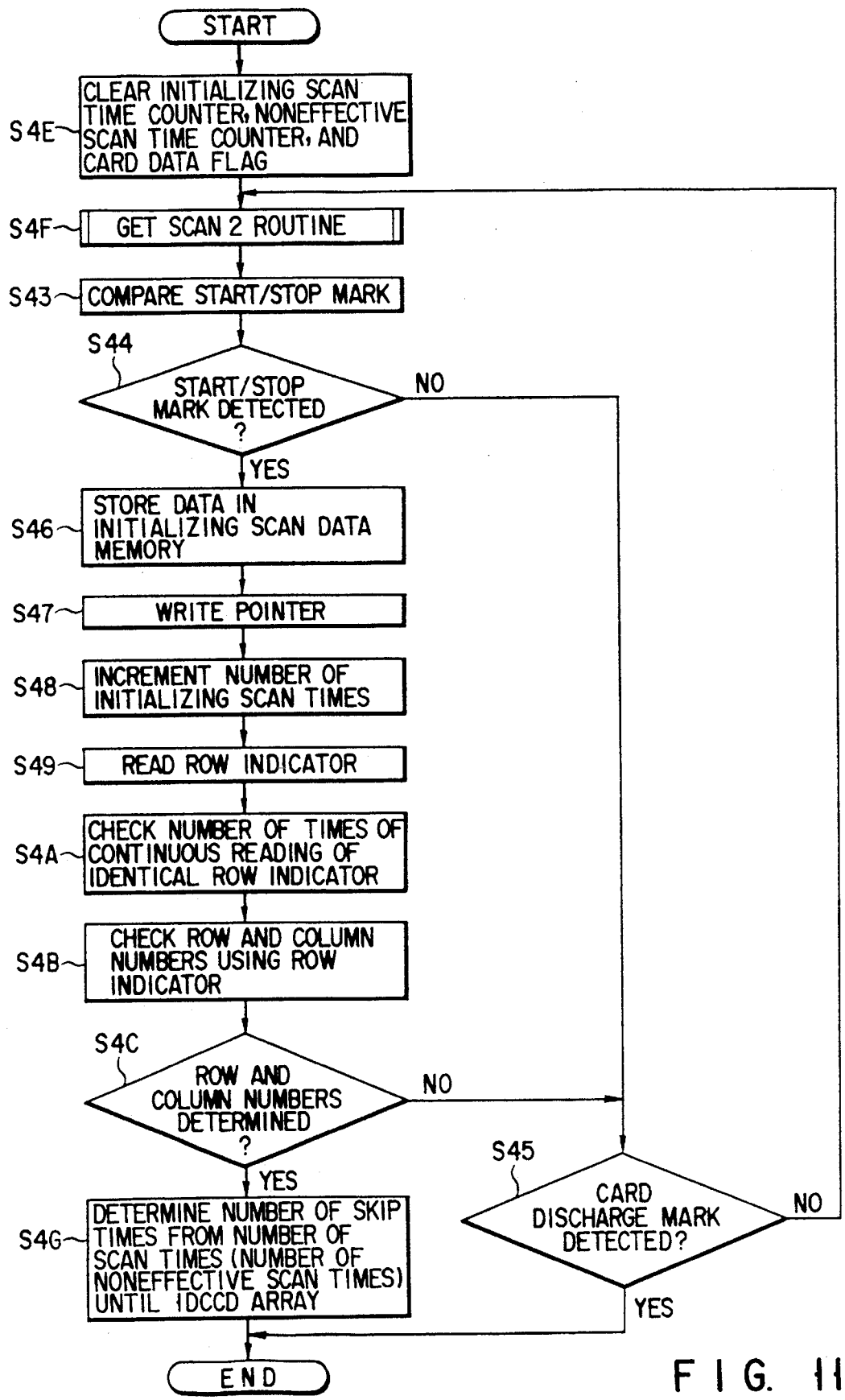
FIG. 11 is a flow chart showing a row number & column number determination routine of the second embodiment.

More specifically, in the second embodiment, the row number & column number determination routine in step S4 is different from that in the first embodiment, and will be described in detail below with reference to FIG. 11. The same reference numerals in FIG. 11 denote the same steps as in FIG. 8.

That is, the initializing scan time counter which is allocated in the initializing scan data memory 316 and indicates the number of scan times required for determining the row number and the column number, the noneffective scan time counter 332H in the data processing circuit 332, and a card data flag (not shown) which is allocated in the data processing circuit 332 and indicates that the card 200 has reached the image pickup position of the 1DCCD array 302 after insertion are cleared (step S4E).

The following steps are substantially the same as those in the first embodiment. However, step S4A (the step of incrementing the contents of the scan time/row register 318G in the data processing circuit 318 shown in FIG. 4A to count the number of times of continuous reading of an identical row indicator 102A, i.e., an identical row) in FIG. 8 is omitted. This is because the number of scan times from detection of insertion of the card 200 until the card reaches the image pickup position of the 1DCCD array 302 is stored in the noneffective scan time counter 332H in the data processing circuit 332 in a GET SCAN 2 routine called in step S4F. Therefore, in this row number & column number determination routine, in step S4G, the number of skip times of a width data string is determined on the basis of the number of scan times from detection of insertion of the card 200 until the card reaches the image pickup position of the 1DCCD array 302, which data is stored in the noneffective scan time counter 332H, and the moving distance during this interval.

A method of determining the number of skip times of a width data string in step S4G will be described below. For example, when the number of scan times from detection of insertion of the card 200 until the card reaches the image pickup position of the 1DCCD array 302 and the moving distance (determined in design of the card reader 200) during this interval is 100 and 10 mm, if the scan rate of the 1DCCD array 302 is 2 kHz, the moving speed of the card 200 is calculated by:

10 mm/(100 times×0.5 ms)=200 mm/s

Note that the height of each row of the barcode symbol 100 is calculated based on the module size (the size of the minimum black bar/white space of the barcode symbol 100) and the module aspect ratio (the ratio of the width to the length of the minimum black bar/white space of the barcode symbol 100) of the barcode symbol 100. For example, if the module size is 10 mil (0.254 mm) and the module aspect ratio (x:y) is 1:3, the height of each row of the barcode symbol 100 is calculated by:

0.254 mm×3=0.762 mm

Therefore, the number of scan times per row is calculated by:

(0.762 (mm)/200 (mm/s))×1,000/0.5 (ms) =7.62 (scans/row)

In this case, if the number of scan times per row is calculated to be 6 scans/row, the number of skip times is set to be 1 (every other width data strings are used/skipped); if the number of scan times per row is calculated to be 9 scans/row, the number of skip times is set to be 2. This is because 3 scans per row are required to read the barcode symbol 100. Therefore, the number of skip times can be properly determined by:

The number of skip times=[| (the number of scan times per row)−3|/3]

(where | | means calculation of an absolute value, and [ ] means rounding off of a number into an integer by truncating)

Figure 12:
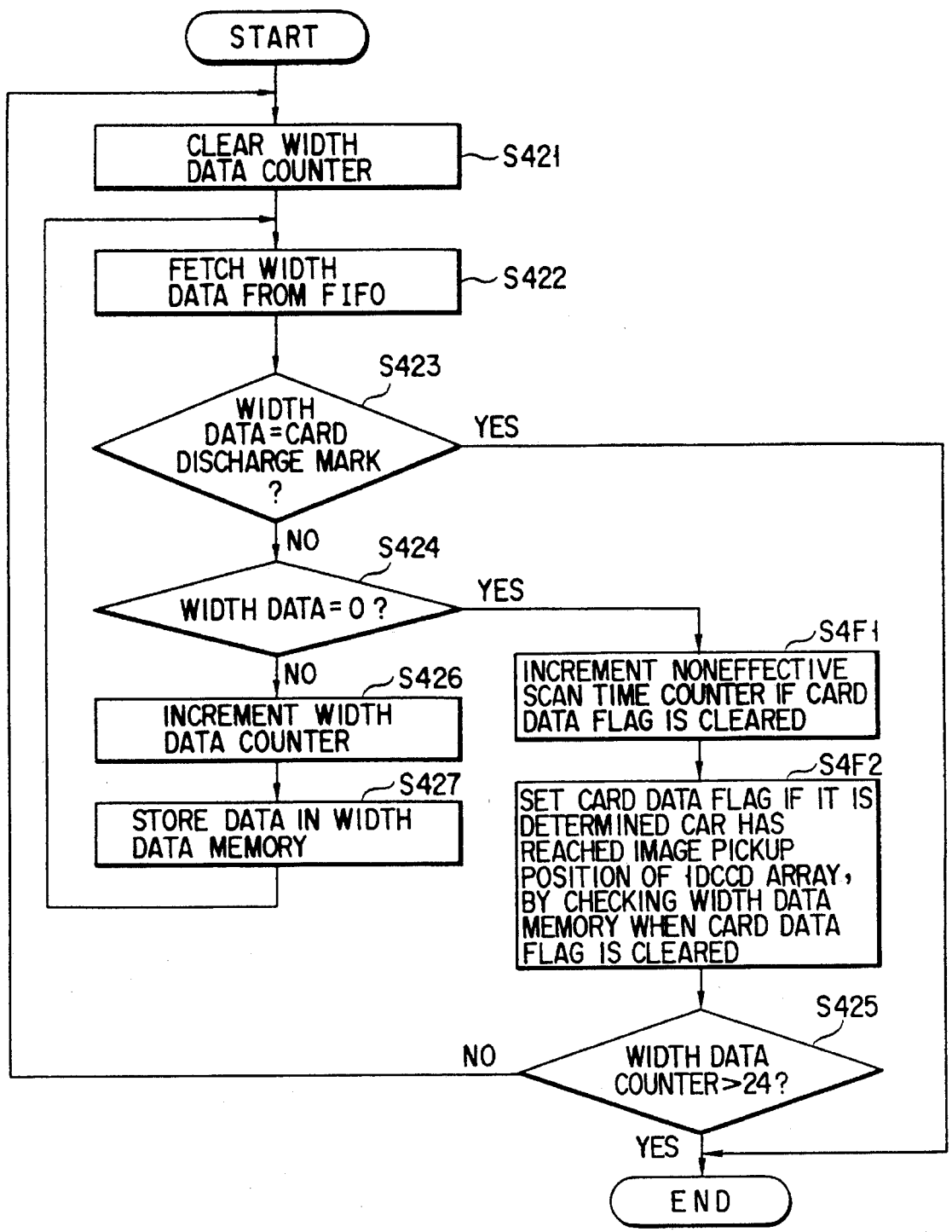
FIG. 12 is a flow chart showing a GET SCAN routine of the second embodiment.

The GET SCAN 2 routine called in step S4F will be described below with reference to FIG. 12. The basic operation is the same as that in the first embodiment, and hence, the same reference numerals denote the same steps as in FIG. 10.

More specifically, it is checked in step S424 if fetched width data is "00H" indicating the end of a width data string for one scan. If YES in step S424, if the card data flag (not shown) which is allocated in the data processing circuit 332 and indicates that the card 200 has reached the image pickup position of the 1DCCD array 302 after insertion of the card 200 is cleared, the contents of the noneffective scan time counter 332H in the data processing circuit 332 are incremented (step S4F1). Furthermore, if a width data string for one scan is read out from the width memory 314 and it can be determined that the card 200 has reached the image pickup position of the 1DCCD array 302, the card data flag (not shown) allocated in the data processing circuit 332 is set (step S4F2).

A method of discriminating if the card 200 has reached the image pickup position of the 1DCCD array 302 will be described below. When the card 200 has not reached the image pickup position of the 1DCCD array 302, the 1DCCD array 302 picks up an image of the opposing inner wall of the slit 300S of the card reader 300. The inner wall of the slit 300S has a pattern unique to each apparatus since the slit 300S is mechanically formed. Therefore, an almost constant width data string, e.g., a width data string including a predetermined number of pieces of width information or a width data string which has a constant width information value, is obtained. Of course, it is preferable for reliable detection to form a pattern different from the barcode symbol 100, e.g., form a special pattern which cannot be included in the barcode symbol 100 on the inner wall of the slit 300S. However, when the card 200 has reached the image pickup position of the 1DCCD array 302, a width data string obtained from the 1DCCD array 302 is obtained by picking up an image of the card 200, and for example, the number of width data largely changes. By detecting this change, it can be determined that the card 200 has reached the image pickup position of the 1DCCD array 302.

Thereafter, it is checked in step S425 using a comparison circuit 332D if the value of a width data counter 332B is larger than a certain threshold value stored in a threshold value register 332C. If YES in step S425, the GET SCAN 2 routine ends; otherwise, the flow returns to step S421 in the same manner as in the first embodiment.

When the print or adhered position of the barcode symbol 100 on the card 200 is fixed, the number of scan times from detection of insertion of the card 200 until the barcode symbol 100 reaches the image pickup position of the 1DCCD array 302 may be counted to detect the moving speed of the card 200, and the number of skip times of a width data string may be determined based on the moving speed. In this case, whether or not the barcode symbol 100 has reached the image pickup position of the 1DCCD array 302 can be determined by checking if the start or stop code 104 or 106 of the barcode symbol 100 is detected in a width data string obtained from the 1DCCD array 302.

In each of the first and second embodiments, as a result of skipping of a width data string by the determined number of skip times, a row including the barcode symbol 100 may be skipped. Such a trouble may occur when the slide speed of the card 200 along the slit 300S of the barcode reader 300 is suddenly increased. In such a case, if the slide speed is increased to a speed falling outside an allowable range, data need not be read. However, the following countermeasure may be taken. That is, memory means for storing skipped width data strings for several scans may be prepared. In this case, the memory means always stores the latest skipped width data strings. If it is determined based on the row number in the row indicator 102A that a given row is unexpectedly skipped, the latest skipped width data strings for several scans are read out from the memory means and are processed. In this manner, a sudden change in speed can be coped with.

A plurality of sensors for detecting the card 200 may be prepared between the insertion detection sensor 326 and the discharge detection sensor 328 of the card 200 in the card reader 300, special markers may be stored in the FIFO memory 312 in units of detections of the card 200 by these sensors, and the data processing circuit 332 may read out these special markers to always detect the moving speed of the card 200. Based on the moving speed of the card 200, the number of scan times per row may be re-determined, and the number of skip times of a width data string may be re-determined.

In general, it is very difficult for an operator to slide, e.g., swipe the card 200 along the slit 300S of the card reader 300 at a constant speed. Therefore, it is effective to detect the moving speed of the card 200 at predetermined intervals, and to dynamically change the number of skip times of a width data string.

When the first and second embodiments are combined, an effective barcode symbol reading apparatus can be provided.

(Third Embodiment)

The third embodiment of the present invention will be described below.

Figure 13A:
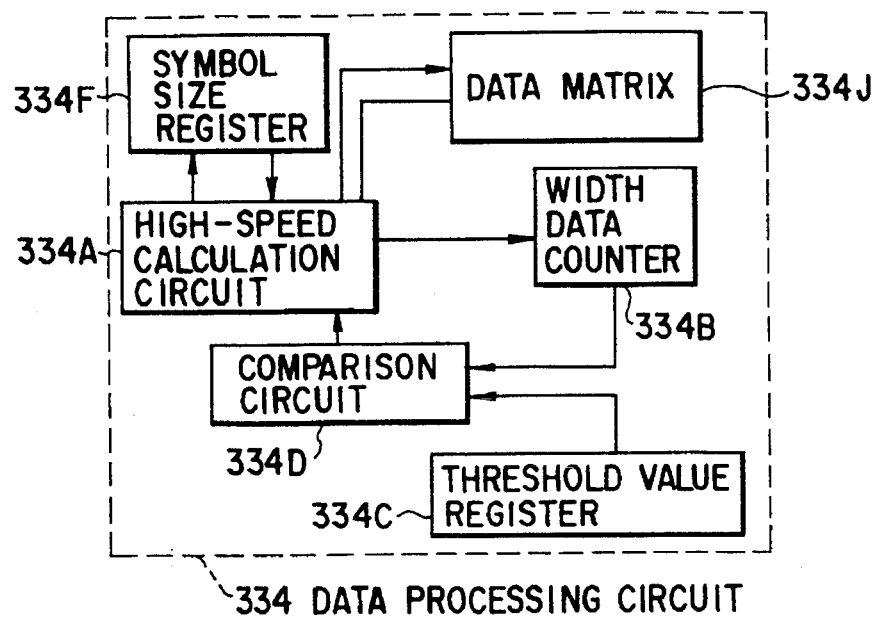
FIG. 13A is a block diagram showing a data processing circuit according to the third embodiment of the present invention.

A barcode symbol reading apparatus (to be also referred to as a card reader hereinafter) of the third embodiment reads the contents of a barcode symbol 100 using a linear sensor 1DCCD array 302 comprising charge-coupled devices (CCDs). The only arrangement different from that in the first embodiment will be described below. FIG. 13A is a block diagram showing the arrangement of a data processing circuit 334, and the same reference numerals in FIG. 13A denote the same parts as in FIG. 4A.

More specifically, in this embodiment, the data processing circuit 334 does not include the skip count register 318E for storing the number of width data strings to be skipped, and the scan time/row register 318G for counting the number of times of continuous scans of an identical row unlike in the first embodiment.

Figure 13B:
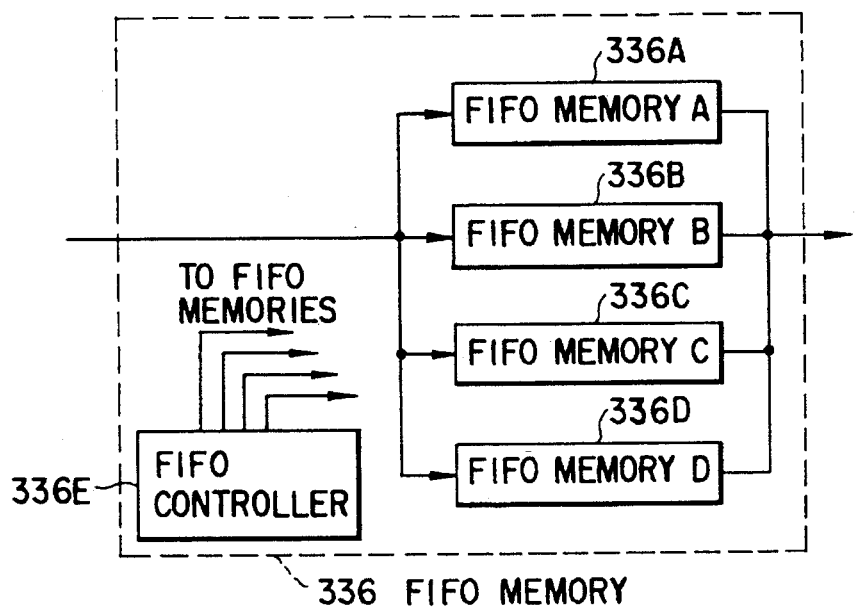
FIG. 13B is a block diagram of a FIFO memory of the third embodiment.
Figure 14A:
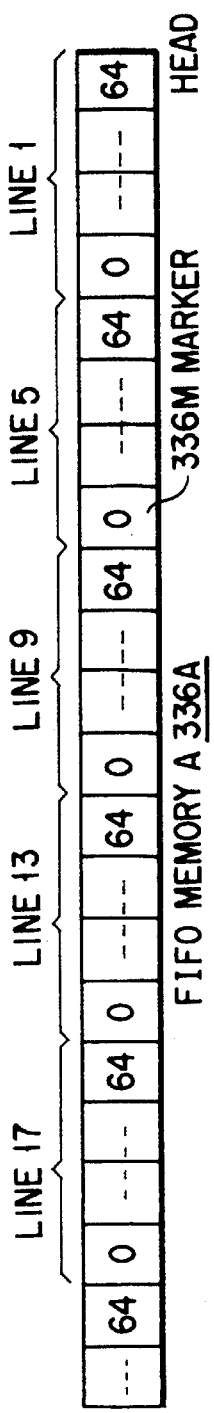
FIGS. 14A, 14B, 14C, and 14D are maps showing the storage contents of four FIFO memories in FIG. 13B.
Figure 14B:
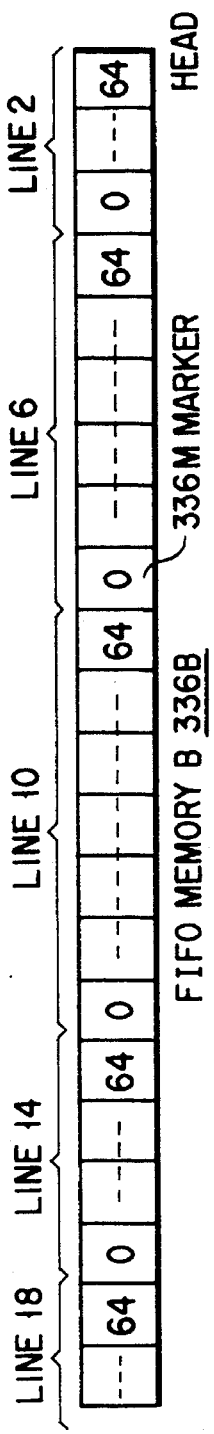
Figure 14C:
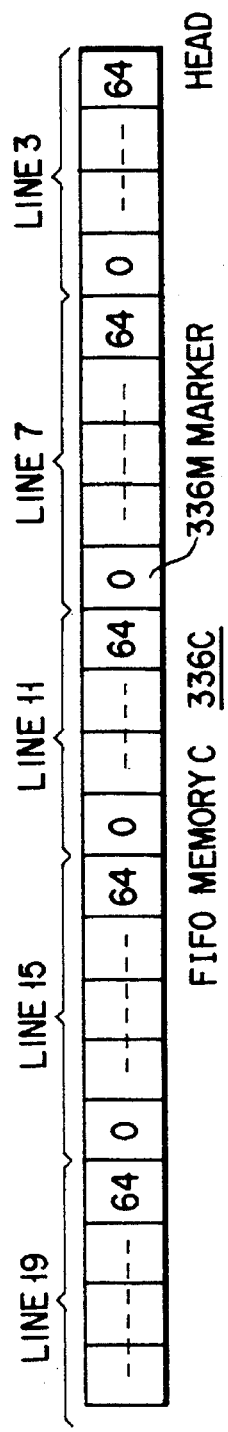
Figure 14D:
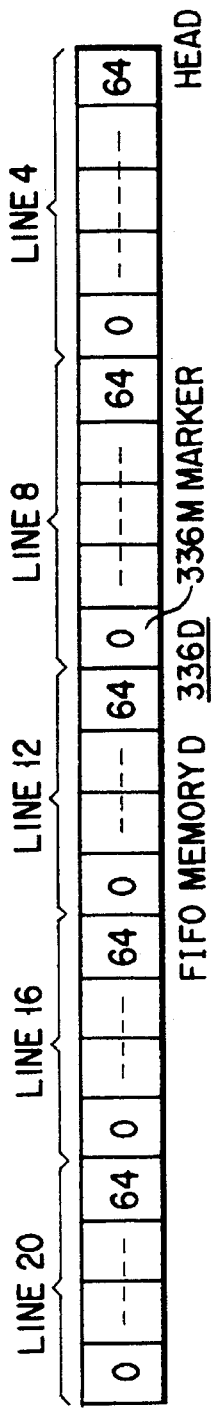

A FIFO memory 336 comprises four FIFO memories (a FIFO memory "A" 336A, a FIFO memory "B" 336B, a FIFO memory "C" 336C, and a FIFO memory "D" 336D), and a FIFO controller 336E, as shown in FIG. 13B. The FIFO controller 336E is used for storing width information counted by the pulse width count circuit 310 in turn in the four FIFO memories in units of a width data string for one scan.

FIGS. 14A to 14D show the storage contents of the four FIFO memories. More specifically, a width data string obtained by the first scan is stored in the FIFO memory "A" 336A (line 1) shown in FIG. 14A, a width data string obtained by the second scan is stored in the FIFO memory "B" 336B (line 2) shown in FIG. 14B, a width data string obtained by the third scan is stored in the FIFO memory "C" 336C (line 3) shown in FIG. 14C, a width data string obtained by the fourth scan is stored in the FIFO memory "D" 336D (line 4) shown in FIG. 14D, and a width data string obtained by the fifth scan is stored in the FIFO memory "A" 336A (line 5). Thereafter, width data strings are stored in turn in the four FIFO memories. A special mark indicating discharge of the card is stored in all the four FIFO memories. Since the number of width data in a width data string for each scan is not constant, the positions of markers 336M of the FIFO memories are different from each other, as shown in FIGS. 14A to 14D.

In the first embodiment described first, in the row number & column number determination routine, the number of times of continuous reading of an identical row indicator is detected to determine the number of scan times per row and to determine the number of skip times of a width data string, thereby properly skipping a width data string for each scan obtained from the 1DCCD array 302. In this manner, data processing is executed efficiently and the barcode symbol 100 is read within a short period of time. On the other hand, in the third embodiment, in place of processing width data strings read out from all the four FIFO memories, a width data string in only one specific FIFO memory, e.g., the FIFO memory "A" 336A, is processed, and width data strings in the remaining three FIFO memories are processed as needed. Thus, the number of width data strings to be processed is decreased and the barcode symbol 100 is read within a short period of time.

A reading algorithm will be described below. Since the schematic flow chart of the algorithm for decoding the contents of the barcode symbol 100 is the same as that shown in FIG. 7 in the first embodiment, an algorithm different from that in the first embodiment will be described below.

Figure 15:
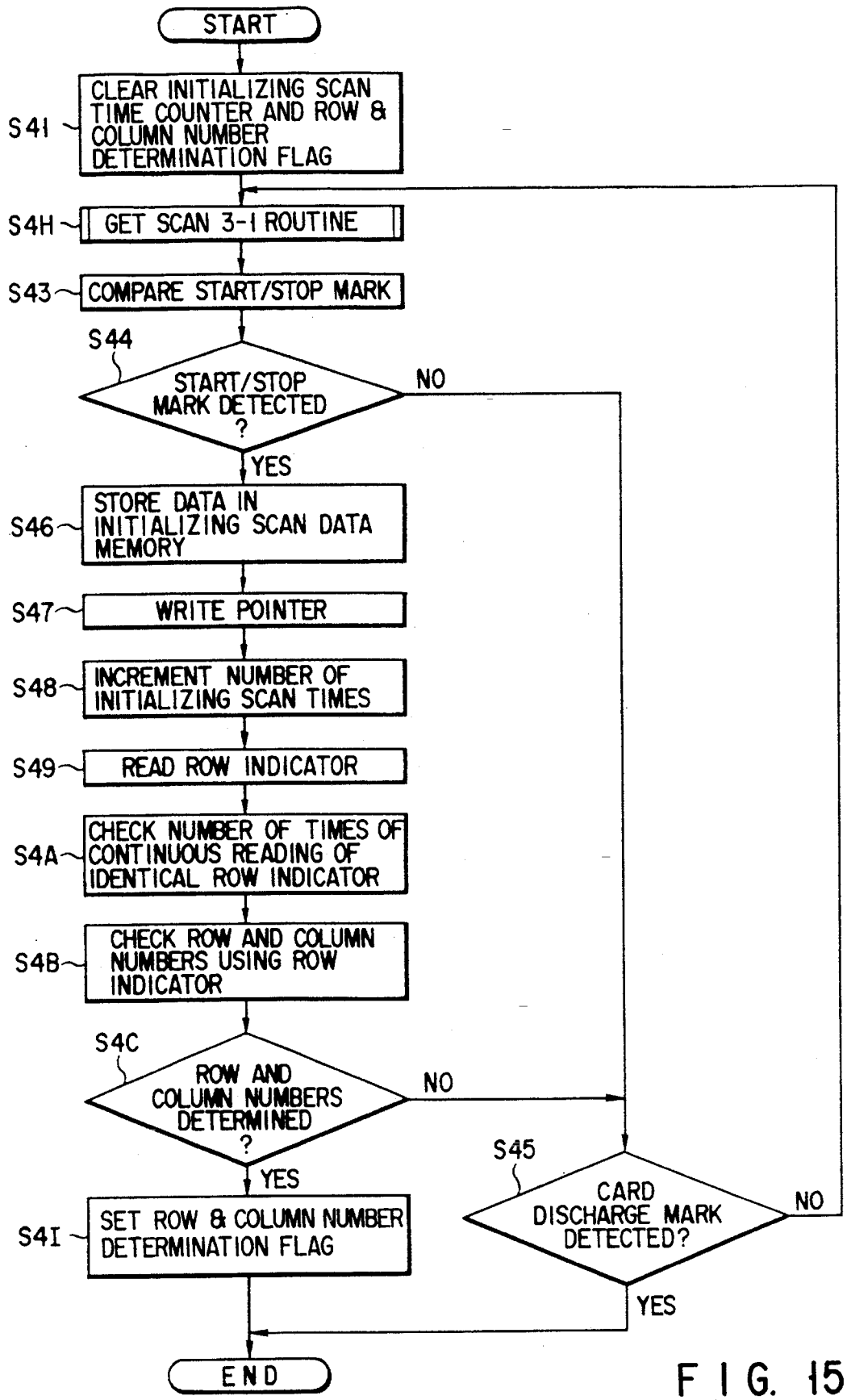
FIG. 15 is a flow chart showing a row number & column number determination routine of the third embodiment.

More specifically, in the third embodiment, the row number & column number determination routine in step S4 is different from that in the first embodiment, and will be described in detail below with reference to FIG. 15. The same reference numerals in FIG. 15 denote the same steps as in FIG. 8.

That is, the initializing scan time counter which is allocated in the initializing scan data memory 316 and indicates the number of scan times required for determining the row number and the column number, and a row & column number determination flag (not shown) which is allocated in the data processing circuit 334 and indicates if the row and column numbers are determined are cleared (step S41), and thereafter, a GET SCAN 3-1 routine is called (step S4H).

The following steps are substantially the same as those in the first embodiment. However, step S4A (the step of incrementing the contents of the scan time/row register 318G shown in FIG. 4A to count the number of times of continuous reading of an identical row indicator 102A, i.e., an identical row) in FIG. 8 is omitted. In this row number & column number determination routine, when the row and column numbers are determined, the row & column number determination flag (not shown) allocated in the data processing circuit 334 is set (step S4I).

The GET SCAN 3-1 routine called in step S4H will be described below with reference to FIG. 16. In this routine, the basic operation is the same as that in the first embodiment, and hence, the same reference numerals in FIG. 16 denote the same steps as in FIG. 10.

More specifically, after the width data counter is cleared (step S421), width data are fetched from the FIFO memory 336 which stores width data from the 1DCCD array 302. At this time, data to be processed are fetched in turn from the four FIFO memories (step S4H1).

In this case, a FIFO memory from which data are to be fetched is determined in accordance with the value of a mark 0 counter for counting the number of "00H"s indicating divisions of width data strings for respective scans. More specifically, a FIFO memory from which data are to be fetched is determined on the basis of the remainder obtained by dividing the value of the mark 0 counter by 4. More specifically, when the value of the mark 0 counter is 0, a width data string to be processed for each scan is fetched from the FIFO memory "A" 336A; when the value of the mark 0 counter is 1, a width data string to be processed for each scan is fetched from the FIFO memory "B" 336B; when the value of the mark 0 counter is 2, a width data string to be processed for each scan is fetched from the FIFO memory "C" 336C; when the value of the mark 0 counter is 3, a width data string to be processed for each scan is fetched from the FIFO memory "D" 336D; and when the value of the mark 0 counter is 4, a width data string to be processed for each scan is fetched again from the FIFO memory "A" 336A.

Note that the mark 0 counter is cleared simultaneously as the ON operation of the SCAN LED and the illumination device in step S3, although not shown. The contents of the mark 0 counter are incremented when it is determined in step S424 that fetched width data is "00H" indicating the end of a width data string for one scan (step S4H2).

In the third embodiment, the scan routine in step S8 is different from that in the first embodiment, and will be described in detail below with reference to FIG. 17. Note that the same reference numerals in FIG. 17 denote the same steps as in FIG. 9.

More specifically, if it is determined in step S86 that the number of initializing scan times is "0", 0 is substituted in a FIFO select variable (not shown) allocated in the data processing circuit 334 (step S8H), and thereafter, a GET SCAN 3-2 routine is called (step S8I). Note that the FIFO select variable indicates a FIFO memory from which data are to be fetched in the GET SCAN 3-2 routine. That is, when data are to be fetched from the FIFO memory "A" 336A, 0 is substituted in the FIFO select variable; when data are to be fetched from the FIFO memory "B" 336B, 1 is substituted in the FIFO select variable; when data are to be fetched from the FIFO memory "C" 336C, 2 is substituted in the FIFO select variable; and when data are to be fetched from the FIFO memory "D" 336D, 3 is substituted in the FIFO select variable.

If the card discharge mark cannot be detected in step S8A, the row number in a width data string for a scan, which was processed in the latest processing, is checked (step S8J). If this row number is equal to or different by 1 from the row number in a width data string for a scan, which was processed in the immediately preceding processing, the flow returns to step S8H.

Figure 18A:
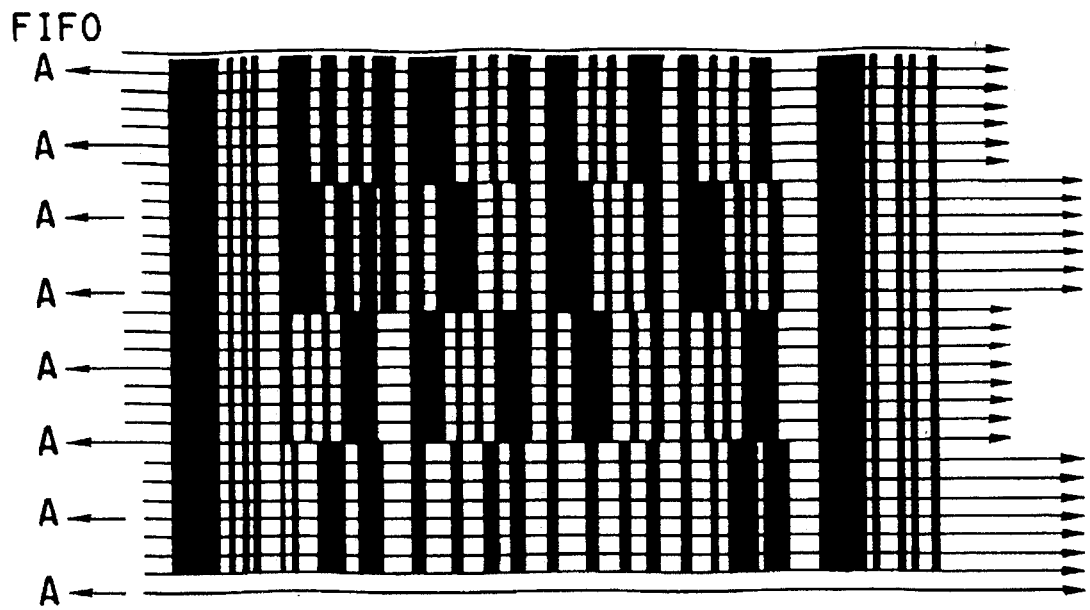
FIGS. 18A and 18B are views showing a difference in scan position in a FIFO memory due to a difference in swipe speed of a card.
Figure 18B:
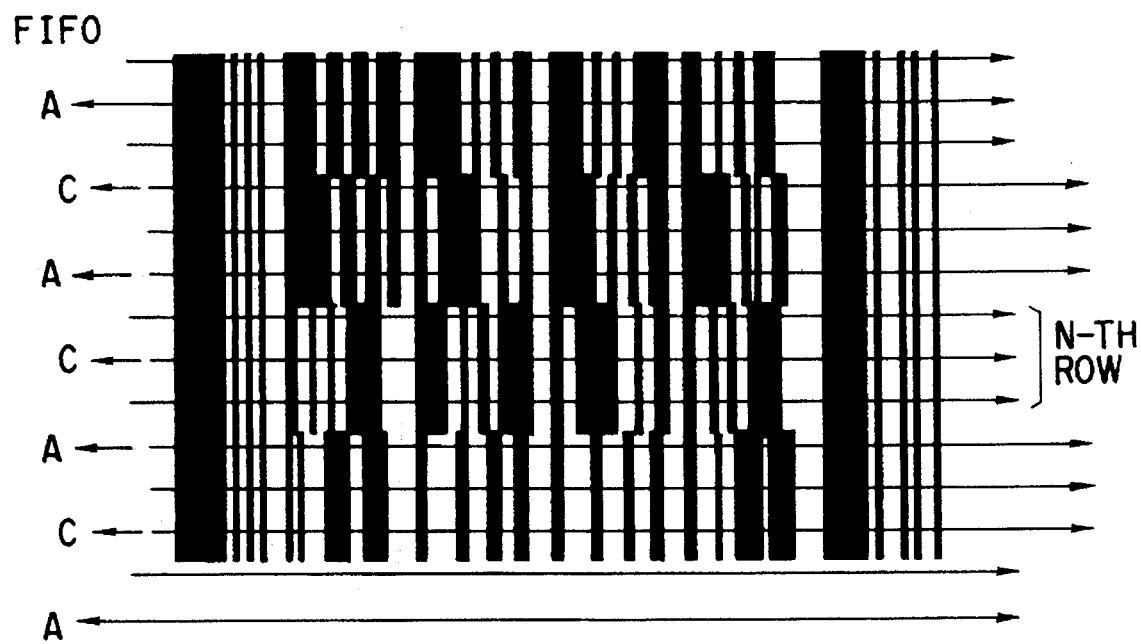

If it is determined in step S8J that the row number in the width data string for the scan, which was processed in the latest processing, is different by two from that in the width data string for the scan, which was processed in the immediately preceding processing, this means that a row is skipped. For example, when the number of scan times per row is large, as shown in FIG. 18A, if data are processed by only the FIFO memory "A" 336A, the number of scan times per row becomes at least 1, and all the rows can be processed, i.e., data characters can be stored in all the rows and columns in a data matrix 334J. On the other hand, when the number of scan times per row is small (when the card is swiped at a higher speed than in FIG. 18A), as shown in FIG. 18B, it is impossible to process all the rows by only the FIFO memory "A" 336A. More specifically, in FIG. 18B, it is impossible to store data characters of the N-th row by only the FIFO memory "A" 336A. In other words, the N-th row is skipped. In this case, 2 is substituted in the FIFO select variable (not shown) (step S8K) to indicate that data are fetched from the FIFO memory "C" 336C in the GET SCAN 3-2 routine called in the next step S8L. In practice, after the processing is executed in step S8L until a width data string of the row number, which is skipped in the case of using only the FIFO memory "A" 336A, is fetched from the FIFO memory "C" 336C (i.e., the same processing as in steps S8B, S8C, and S8D is repeated until step S8L), the flow advances to step S8B. In this manner, in FIG. 18B, the width data string of the N-th row is processed, and data characters in the N-th row can be stored in the data matrix 334J.

Figure 19:
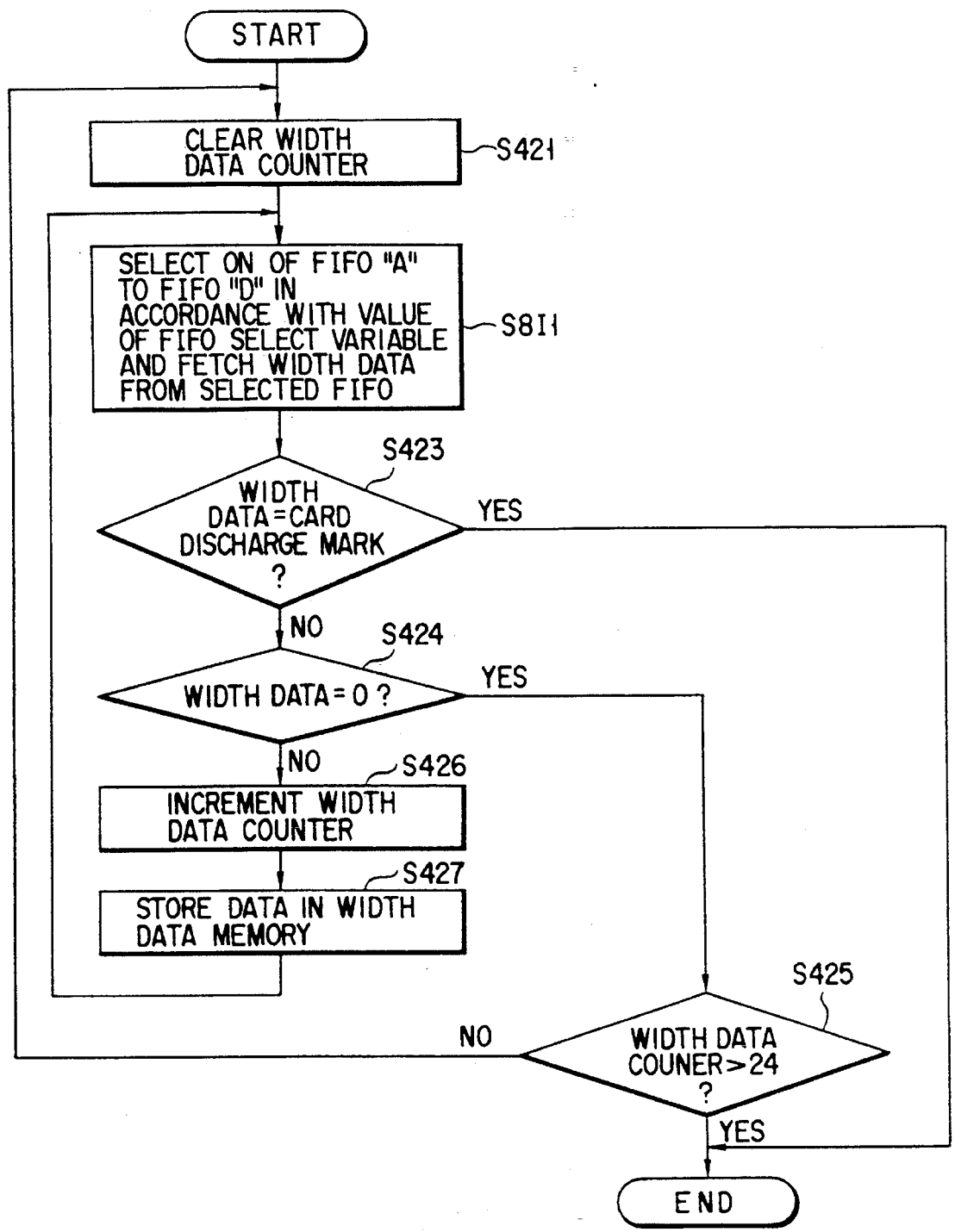
FIG. 19 is a flow chart showing a GET SCAN 3-2 routine in FIG. 17.

The GET SCAN 3-2 routine called in steps S8I and S8L will be described below with reference to FIG. 19. The basic operation of this routine is the same as that in the first embodiment, and hence, the same reference numerals in FIG. 19 denote the same steps as in FIG. 10.

More specifically, after the width data counter is cleared (step S421), width data are selectively fetched from the four FIFO memories in accordance with the value of the select variable (not shown) which is allocated in the data processing circuit 334 and is set in the scan routine shown in FIG. 17 (step S811). For example, if the FIFO select variable is 0, width data are fetched from the FIFO memory "A" 336A; if the select variable is 1, width data are fetched from the FIFO memory "B" 336B; if the select variable is 2, width data are fetched from the FIFO memory "C" 336C; or if the select variable is 3, width data are fetched from the FIFO memory "D" 336D.

A method of selecting a FIFO memory from which a width data string is to be fetched will be described below. When a width data string with a row number, which is skipped in the case of using only the FIFO memory "A" 336A, can be fetched from the FIFO memory "C" 336, the following processing may be performed for the contents of the FIFO memory "A" 336A→FIFO memory "C" 336C→ FIFO memory "A" 336A→FIFO memory "C" 336C→. . . Alternatively, the following processing may be performed for only the contents of the FIFO memory "A" 336A again, and when a row number which is undesirably skipped is found, the contents of the FIFO memory "C" 336C may be processed again. With the latter method, when the card is swiped slowly from the middle of the slot, data characters may be efficiently stored in the data matrix 334J using only the contents of only the FIFO memory "A" 336A.

When a width data string with a row number, which is skipped in the case of using only the FIFO memory "A" 336A, cannot be fetched from the FIFO memory "C" 336C, the contents of the remaining FIFO memories "B" 336B and "D" 336D are processed. Therefore, depending on the swipe speed, three or four FIFO memories may be alternately processed. When the card is swiped at a very high speed, all the four FIFO memories must be processed. However, in this case, the processing time is the same as that required when only one FIFO memory is used. In this manner, depending on the storage state of the data matrix 334J, the FIFO memory "A" 336A, "B" 336B, "C" 336C, or "D" 336D from which a width data string is to be fetched is determined, thus allowing efficient processing of scanned width data strings.

In the above description, the same processing as in steps S8B, S8C, and S8D is executed in step S8L in the scan routine shown in FIG. 17. When a width data string of the skipped row is obtained from the FIFO memory "C" 336C, steps S8B, S8C, and S8D are executed again. In order to avoid repetitive processing, the control may advance to step S8H after steps S8B, S8C, S8D, and S8E are executed in step S8L. In this case, whether or not information is decodable is not confirmed. However, since this confirmation can be made using the next width data string, no problem is posed.

In the third embodiment, the four FIFO memories are used. However, the present invention is not limited to the four memories. The FIFO memories may be processed in various processing orders. For example, after all the contents of the FIFO memory "A" 336A are processed (until a special mark indicating discharge of the card is detected), the contents of other FIFO memories may be processed. Alternatively, when a width data string for the immediately preceding scan is to be processed during processing of the FIFO memory "A" 336A, the contents of the FIFO memory "D" 336D may be skipped; or when a width data string for the next scan is to be processed during processing of the FIFO memory "A" 336A, the contents of the FIFO memory "B" 336B may be used. Thus, such a concept can be reflected in the reading algorithm.

As described above, since the contents of only a specific FIFO memory are processed, and the contents of other FIFO memories are processed as needed, an apparatus which can efficiently read the barcode symbol 100 can be provided.

In each of the first to third embodiments (the first embodiment has been described in detail), the widths of bars and spaces in scan data binarized by the binarization circuit 308 are counted by the pulse width count circuit 310 in synchronism with the operation clocks (supplied from the CCD driver 304) of the 1DCCD array 302. Alternatively, the widths of bars and spaces may be counted in synchronism with clocks faster than the operation clocks of the 1DCCD array 302. In the above description, a value "00H" is stored in the FIFO memory 312 at the end of a width data string for each scan. Alternatively, it is also effective to store the value "00H" in the FIFO memory 312 at the beginning of a width data string for each scan. In the above description, the marker write circuit "O" 330 stores a special mark "2100" in the FIFO memory 312 upon discharge of the card. If it is known in advance that a value equal to or larger than a width "200" does not exist upon counting of the width of the barcode symbol 100, when a special mark stored upon discharge of the card uses, e.g., "225", the FIFO memory 312 can adopt a conventional 8-bit arrangement. Alternatively, the data processing circuit 318 may comprise a digital signal processor (DSP).

Also, when a detection device such as a photodetector or the like is used in place of the 1DCCD array 302 comprising charge-coupled devices (CCDs), a barcode symbol reading apparatus which can read barcode symbol information within a short period of time can be provided like in the first to third embodiments. This arrangement can be realized by using a semiconductor laser as the illumination device (not shown), and by replacing the 1DCCD array 302 in FIG. 1 by a photodetector, and the CCD driver 304 and the CCD amplifier 306 by a driver circuit comprising a scanning means for mechanically scanning the semiconductor laser in a direction perpendicular to a moving direction of the card 200 and an amplifier circuit for the photodetector.

When an area sensor comprising charge-coupled devices (CCDs) is used in place of the 1DCCD array 302 comprising charge-coupled devices (CCDs), a barcode symbol reading apparatus which can read barcode symbol information within a short period of time can be provided like in the first to third embodiments. In this case, when the card 200 reaches the image pickup position of the area sensor, an image of the card 200 including the barcode symbol 100 is picked up by the area sensor by stroboscopic emission, and thereafter, data are sent from a driver circuit to an amplifier circuit line by line. In this manner, data processing can be realized by the same arrangement as in FIG. 1.

In the above description, the PDF417 code symbol as a two-dimensional barcode symbol with high recording density has been exemplified. When the present invention is applied to one-dimensional barcode symbols such as JAN/UPC/EAN codes, ITF (Interleaved 2 of 5) codes, and the like, and other two-dimensional barcode symbols such as CODE16K, CODE49, DATA CODE, VERI CODE, SOFT STRIP, and the like as in the first to third embodiments described above, a barcode symbol reading apparatus which can read barcode symbol information within a short period of time can be provided, as a matter of course. In particular, the present invention is effective for CODE16K and CODE49 since they are multiple-row barcode symbols as in the PDF417.

FIGS. 20A and 20B are perspective views showing systems using other card readers. A difference from each of the above embodiments is a method of decoding the card 200 on which the barcode symbol 100 is printed or adhered.

A system shown in FIG. 20A reads the contents of the barcode symbol 100 on the card 200 which is inserted/removed by an operator into/from an insertion port 600I of a card reader 600, in place of reading the contents of the barcode symbol 100 when the card 200 is slid along the slit 300S of the card reader 300. This card reader is of so-called a time card type, and is generally called a dip type card reader. In the dip type card reader, an operator holds a portion (handling area 200H) where the barcode symbol 100 is not printed of the card 200, and inserts the card 200 into the insertion port 600I of the card reader 600. When the operator determines that the card 200 has reached a contact position in the card reader 600, the operator removes the card 200 from the card reader 600. Whether or not the card 200 has reached the contact position can be determined by checking if the card 200 contacts, e.g., a mechanical stopper in the card reader 600.

As shown in FIG. 20B, the dip type card reader may be arranged, so that the card 200 is inserted/removed into/from the front surface side of the card reader 600. In such a dip type card reader, a barcode symbol reading apparatus which can process various barcode symbols at high speed can be provided by applying the reading algorithm as in the first to third embodiments.

Each of the first to third embodiments is particularly effective when the card 200 is swiped at low speed. If the following arrangement is adopted, a sufficient effect can also be expected.

(Fourth Embodiment)

The fourth embodiment of the present invention will be described below.

A barcode symbol reading apparatus (to be referred to as a card reader hereinafter) of the fourth embodiment is basically the same as that in the first embodiment, and adopts a reading algorithm slightly different that in the first embodiment.

More specifically, in this embodiment, a scan routine is different from that in the first embodiment, and will be described in detail below with reference to FIG. 21. Note that the same reference numerals in FIG. 21 denote the same steps as in FIG. 9. The scan routine shown in FIG. 21 is basically the same as that in the first embodiment, and step S8M of checking if information is decodable is added after step S8E of sequentially storing data characters after the row indicator 102A in the data matrix from the confirmed row number position. Step S8M pays attention to a portion, for which data character storage processing has been finished, in the data matrix. More specifically, it is checked based on the number of data characters, which cannot be stored in the data matrix for which the data character storage processing has been finished, if information is decodable. If it is determined in step S8M that information is nondecodable, this scan routine immediately ends.

Figures 22A, 22B:
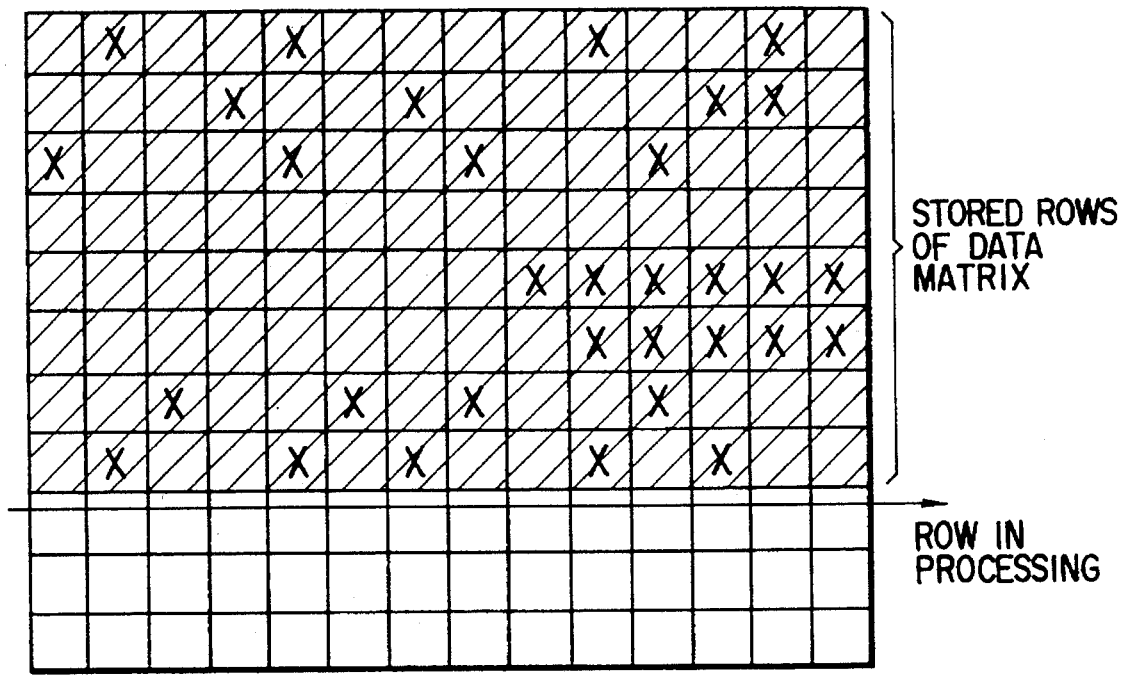
FIG. 22A is a table showing in detail error correction performance levels (security levels) of a two-dimensional barcode symbol PDF417.
FIG. 22B is a data matrix for explaining decision for a nondecodable state.

The barcode symbol described in the above-mentioned first embodiment is a two-dimensional barcode symbol PDF417. The PDF417 barcode symbol has nine error correction performance levels (security levels), i.e., from security level 0 at which error correction is disabled to security level 8 at which error correction can be performed even when 510 data characters cannot be normally read. FIG. 22A shows the security levels in detail. For example, if the barcode symbol 100 to be currently read has security level 4, the number of error-correctable data characters is 30. Therefore, if it is determined in step S8M that, for example, 32 data characters in the data matrix have been already determined to be impossible to store (see marks × in FIG. 22B), this means that the barcode symbol 100 can no longer be read even if the following width data strings from the 1DCCD array 302 are processed.

This determination is made based on the fact that the card reader 300 reads the barcode symbol 100 by a sequential reading method. More specifically, since a row, which has already been scanned once, in the barcode symbol 100 is never scanned again, nondecodable information can be determined based on the number of data characters which must be currently stored in the data matrix but are not stored in practice.

With this arrangement, a reading result can be informed to an operator earlier than a case wherein whether or not information is decodable is discriminated after the entire surface of the barcode symbol 100 (the entire surface of the card 200) is scanned. This arrangement is also very effective since nondecodable information can be quickly informed to an operator even when the card 200 is swiped at low speed. Furthermore, when this embodiment is combined with each of the first to third embodiments, a more effective barcode symbol reading apparatus can be realized.

(Fifth Embodiment)

The fifth embodiment of the present invention will be described below.

In this embodiment, a serial-in parallel-out memory (SIPO memory) 312A (indicated by a broken line in FIG. 1) is adopted in place of the FIFO memory 312 of the first embodiment, and the data processing circuit 318 comprises an address generator for the SIPO memory.

The SIPO memory 312A is a memory for receiving serial data and outputting parallel data, and is normally used as an image memory. In this embodiment, eight memories are used in parallel with each other, so that 8-bit parallel width data strings can be input as in the FIFO memory 312 of the first embodiment. The data processing circuit 318 can sequentially read out a width data string from the SIPO memory as in the FIFO memory 312 of the first embodiment, and can also randomly read out data therefrom by controlling the address generator. In this manner, the fifth embodiment has an arrangement basically the same as that of the first embodiment.

A reading algorithm will be described below. The schematic flow chart showing the algorithm for decoding the contents of the barcode symbol 100, the row number & column number determination routine, the scan routine, and the GET SCAN routine are the same as those in the first embodiment. The only difference is that a width data string is read out from the SIPO memory 312A by controlling the address generator.

When the SIPO memory 312A is used, the following operation can be realized. More specifically, even when a certain row of the barcode symbol is skipped by a skipping operation of a predetermined number of skip times, e.g., when the slide speed of the card 200 along the slit 300S of the barcode reader 300 is suddenly increased, since a skipped width data string remains in the SIPO memory 312A, the skipped row can be re-processed by reading out a width data string one or two scans before if it is determined that a certain row is skipped.

When the SIPO memory 312A is adopted, the initializing scan data memory 316 of the first embodiment can be omitted.

As described above, according to the first to fifth embodiments of the present invention, the relative moving speed between a barcode symbol and an image pickup device is detected from a reading signal from the image pickup device for scanning the barcode symbol, so that data to be used in reading is selected from the reading signal from the image pickup device on the basis of the relative moving speed, and unnecessary data is skipped, thus providing a barcode symbol reading apparatus which assures high-speed processing.

(Sixth Embodiment)

Figure 23:
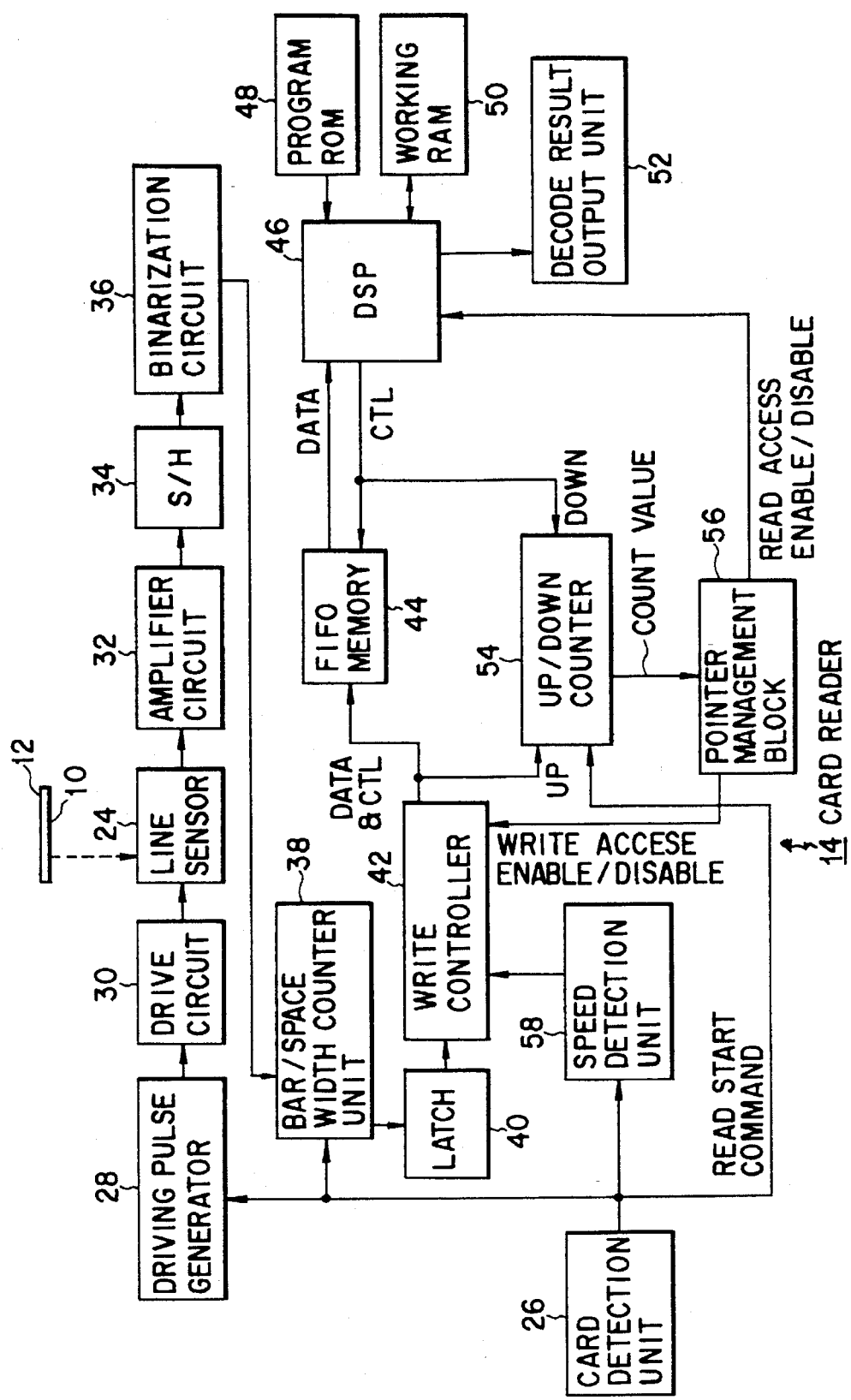
FIG. 23 is a block diagram showing a barcode reader according to the sixth embodiment of the present invention.

FIG. 23 is a block diagram of a barcode reader for reading a two-dimensional barcode symbol PDF417 according to the sixth embodiment of the present invention, and FIG. 24A is a perspective view showing the outer appearance of a system to which the barcode reader of this embodiment is applied.

As shown in FIG. 24A, in this system, a barcode symbol 10 is recorded on a card 12 by printing, and is read by sliding the card 12 along a slit 16 of a card reader 14. The read information is supplied to a host computer 20 via a cable 18, and is displayed on the host computer 20. At this time, LEDs 22 indicate if the card is being scanned, if the barcode symbol can be decoded, and so on.

In the following description of the embodiment, data to be stored in a memory is width information of bars and spaces. Of course, a value obtained by A/D-converting the intensity of light reflected by the barcode symbol 10 may be stored.

The card reader 14 of this embodiment has an arrangement shown in FIG. 23. More specifically, an image of the barcode symbol 10 is formed on a CCD line sensor 24 using an optical system (not shown). Of course, the line sensor 24 extends in the alignment direction of bars and spaces so that the widths of bars and spaces of the barcode symbol 10 can be read. When the two-dimensional barcode symbol 10 is read using the line sensor 24, the entire barcode symbol 10 must be read by moving the recording area of the two-dimensional barcode symbol 10 on the card 12 so as to be picked up by the line sensor 24.

When a card detection unit 26 detects insertion of the card 12, it generates a read start command, thus starting a read operation. More specifically, various signals for driving the line sensor 24 are generated by a driving pulse generator 28, and their voltages or currents are adjusted by a drive circuit 30. Thereafter, these signals are input to the line sensor 24.

Differences are generated in the amount of light received by the line sensor 24 in correspondence with black/white colors of bars/spaces of the barcode symbol 10, and are output from the line sensor 24 as a signal in which voltage differences are time-serially generated. Since this output signal is normally very weak, it is amplified by an amplifier circuit 32. The amplified signal is sampled at an output portion near a stable pixel center of each pixel output signal from the line sensor 24 by a sample-and-hold (to be abbreviated as S/H hereinafter) circuit 34, thus holding a signal level. The sampled signal is binarized by a binarization circuit 36, and the output signal from the binarization circuit 36 is input to a bar/space width counter unit 38.

The bar/space width counter unit 38 detects the leading and trailing edges of the binarized output signal. These leading and trailing edges become points of a signal representing a boundary between a bar and a space. The bar/space width counter unit 38 measures time intervals of data from the leading edge to the trailing edge or from the trailing edge to the leading edge to obtain width data of bars and spaces. Clocks used in the count operation can be clocks synchronized with clocks used in the S/H operation in the S/H circuit 34.

The counted width data are latched by a latch 40, and are then input to a write controller 42. The write controller 42 supplies the input width data to a first-in first-out (to be abbreviated as FIFO hereinafter) memory 44, and stores them in the memory 44. The width data written in the FIFO memory 44 are transferred to a barcode decoder unit.

In this embodiment, the barcode decoder unit is constituted by a DSP (digital signal processor) 46, a program ROM 48 for the DSP 46, a working RAM 50, and a decode result output unit 52. In pace of the DSP 46, another microprocessor may be used.

In the FIFO memory 44, in order to read new written data, read and write pointers in the FIFO memory 44 have the following rules. More specifically, the write pointer must go ahead of the read pointer and must not overtake it. Furthermore, in some types of the FIFO memory 44, a predetermined relative address pointer width or more is defined between the read and write pointers. When the read and write clock rates are equal to each other, no problem is posed. However, when the read and write clocks have different rates, the above-mentioned rule may often be violated. In this embodiment, these pointers are managed by an up/down counter 54 and a pointer management block 56.

An example of the operation of the pointer management will be described below with reference to FIG. 24B. The up/down counter 54 performs a count-up operation in response to a write (W) command, output from the write controller 42, for writing data in the FIFO memory 44, and performs a count-down operation in response to a read (R) command, output from the write controller 42, for reading data from the FIFO memory 44. Thus, the contents of the counter are counted up by one pointer when one data is written in the FIFO memory 44. The counter is cleared by a read start command from the card detection unit 26. The output from the up/down counter 54 becomes a relative address pointer difference between the read and write pointers in the FIFO memory 44.

The relative address pointer difference (n) is input to the pointer management block 56. The pointer management block 56 controls to enable/disable a read/write access to the FIFO memory 44 on the basis of the following comparison results with the pointer difference. More specifically, in FIG. 24B, a read access is disabled until the write pointer goes ahead of the read pointer by a minimum relative address pointer width (min standard) in the standard of the FIFO memory 44. When the count-up operation further continues, and the count output exceeds the minimum relative address pointer width of the standard and is equal to or smaller than a maximum relative address pointer width (max standard) in the standard of the FIFO memory 44-α, both read and write accesses are enabled (where α is the predicted maximum number of data fetched during one scan of the line sensor 24). When the count output exceeds the maximum relative pointer width in the standard of the FIFO memory 44-α and is equal to or smaller than the maximum relative pointer width in the standard of the FIFO memory 44, only a read access is enabled. Thus, even when the relative address pointer exceeds the maximum relative address pointer width in the standard of the FIFO memory 44 while data from the line sensor 24 is written in the FIFO memory 44 (when the write address pointer in the FIFO memory 44 catches up the read address pointer), the write access to the FIFO memory 44 can be prevented from being interrupted at the middle of data for one scan.

Note that the FIFO memory 44 is used as means for storing width data. However, depending on performance of the DSP 46, data may be directly supplied to the DSP 46 to execute real-time processing without using the memory.

Figure 25A:
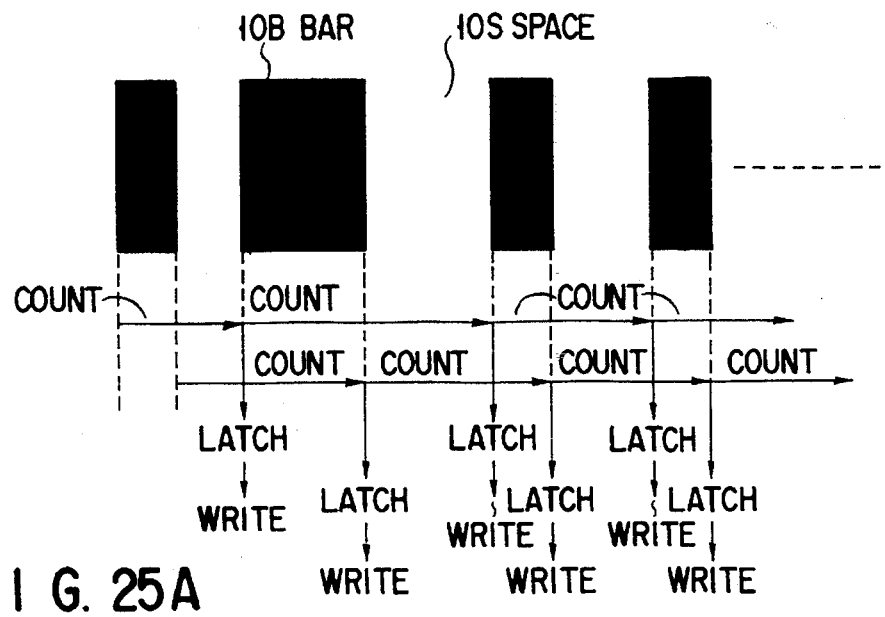
FIG. 25A is a view for explaining another example of data to be stored in a memory.

As data to be stored in the memory, as shown in FIG. 25A, a value as a sum of the widths of a space 10S and its neighboring bar 10B such as the width from an edge at which the space 10S changes to the bar 10B to the next edge under the same condition, the width from an edge at which the bar 10B changes to the space 10S to the next edge under the same condition, or the like, may be stored. Such a width counter method can easily cope with a case wherein the width of the bar becomes larger or smaller than a rated value due to poor print precision of the barcode symbol 10.

In place of an image signal from the CCD line sensor 24, the intensity of reflected light of a scanning laser beam spot may be used.

Figure 25B:
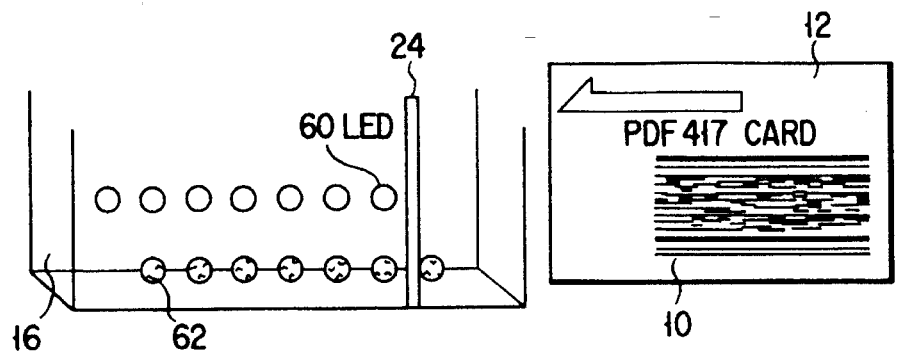
FIGS. 25B and 25C are schematic views each showing the arrangements of a speed detection unit.

As described above, the barcode symbol is read. When a two-dimensional barcode symbol is read using the line sensor 24, the card 12 on which the barcode symbol 10 is printed must be moved, as shown in FIG. 24A. At this time, the line sensor 24 is arranged near the entrance of the slit 16, as shown in FIG. 25B. A speed detection unit 58 shown in FIG. 23 includes LEDs 60 and photodiodes 62, as shown in FIG. 25B, and detects the moving speed of the card 12. Two or more pairs of the LEDs 60 and photodiodes 62 are arranged along the slit 16 on the two side walls of the slit 16 so as to oppose each other. In response to a read start command from the card detection unit 26, all the LEDs 60 are illuminated, and the corresponding photodiodes 62 are turned on. Thereafter, as the card 12 moves, light emitted from each LED 60 is shielded by the card 12, and the photodiodes 62 are turned off in turn. The speed detection unit 58 detects the moving speed of the card 12 on the basis of the turn-off speed of the outputs from the photodiodes 62. The speed detection unit 58 supplies the detected moving speed of the card 12 to the write controller 42.

In the two-dimensional barcode symbol PDF417, a predetermined aspect ratio is determined for a minimum module width constituting the barcode symbol. For example, if the minimum module width is 10 mil and the aspect ratio is (width 1:height 3), the length of one row, in the moving direction, of the barcode symbol is 30 mil. Based on the length of one row, in the moving direction, of the barcode symbol, the scan speed of the line sensor 24, and the moving speed of the card 12, the number of scan times per row of the barcode symbol 10 can be calculated. In addition to a write access enable/disable signal from the pointer management block 56, the write controller 42 controls a write enable signal of the FIFO memory 44 by thinning out write timings at equal intervals on the basis of the calculated number of scan times per row of the barcode symbol, so that a predetermined number of times of write accesses are performed per row of the barcode symbol.

In this embodiment, in order to detect the moving speed of the card 12, the LEDs 60 and the photodiodes 62 are used, and the line sensor 24 is arranged at a position shown in FIG. 25B. However, another optical detection means may be used.

Figure 25C:
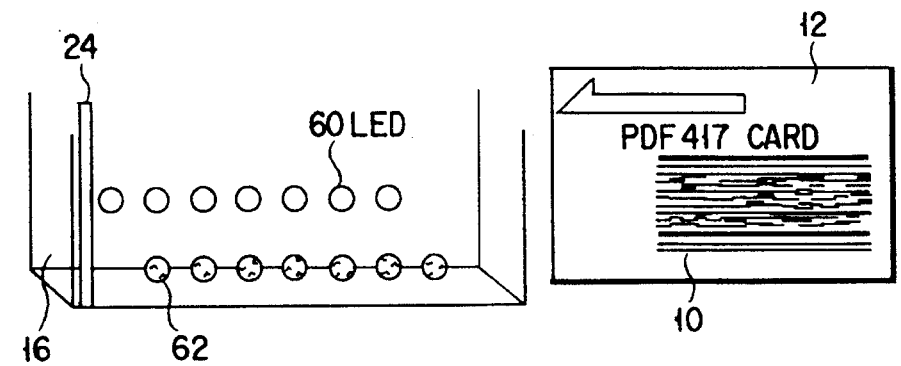
Figure 26A:
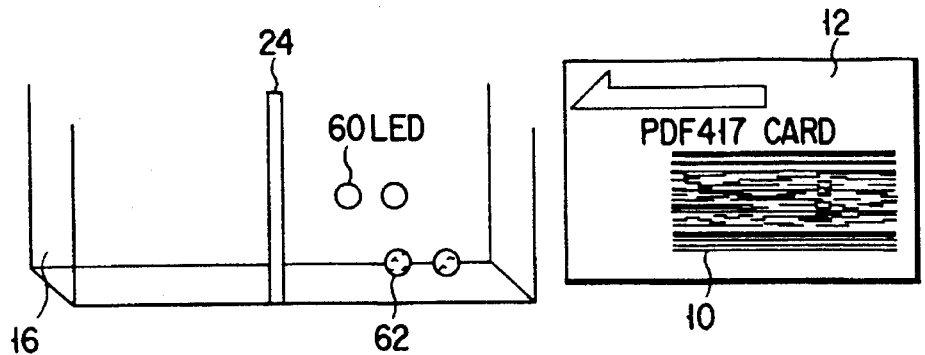
FIGS. 26A and 26B are schematic views showing other arrangements of the speed detection unit.

The numbers of LEDs 60 and photodiodes 62 and the positional relationship between them and the line sensor 24 are not limited to the arrangement shown in FIG. 25B. For example, arrangements shown in FIGS. 25C and 26A may be adopted. More specifically, in FIG. 25C, a plurality of pairs of LEDs 60 and photodiodes 62 are arranged before the card 12 reaches the position of the line sensor 24, and an acceleration is detected together with the speed of the card 12. The speed detection unit 58 predicts the final speed based on the detected speed and acceleration, thus detecting the moving speed of the card 12. Furthermore, in FIG. 26A, two pairs of LEDs 60 and photodiodes 62 are arranged to detect the speed of the card 12 which passes between these two pairs of LEDs 60 and photodiodes 62, and the detected card speed is corrected in correspondence with the movement of the hand of an operator, thus detecting the moving speed of the card 12.

Figure 26B:
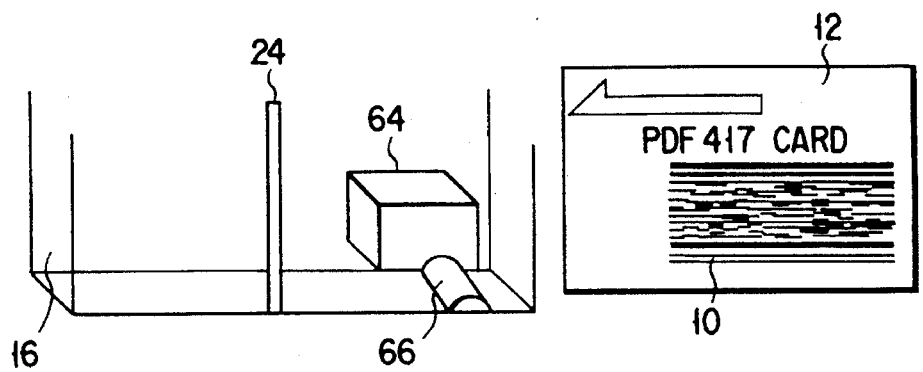

The present invention is not limited to the optical means. For example, as shown in FIG. 26B, a rotary encoder 64 may be used. In this case, a signal from the rotary encoder 64 is obtained based on the rotational force of a roller 66 by utilizing the frictional force generated upon passage of the card 12 in the slit 16 so as to detect the speed.

Furthermore, in this embodiment, the moving speed of the card 12 on which the barcode symbol 10 is recorded is detected. However, the card 12 may be fixed in position, the line sensor 24 may be moved, and the moving speed of the line sensor 24 may be detected.

In this embodiment, a write access to the FIFO memory 44 is controlled by controlling a write enable signal to the FIFO memory 44. Alternatively, by controlling a read access from the line sensor 24, the write access to the FIFO memory 44 may be stopped without controlling the write enable signal of the FIFO memory 44.

(Seventh Embodiment)

Figure 27:
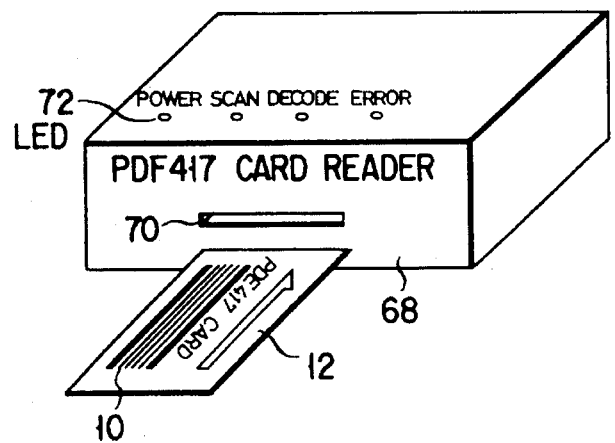
FIG. 27 is a perspective view showing the outer appearance of a barcode reader according to the seventh embodiment of the present invention.
Figure 30:
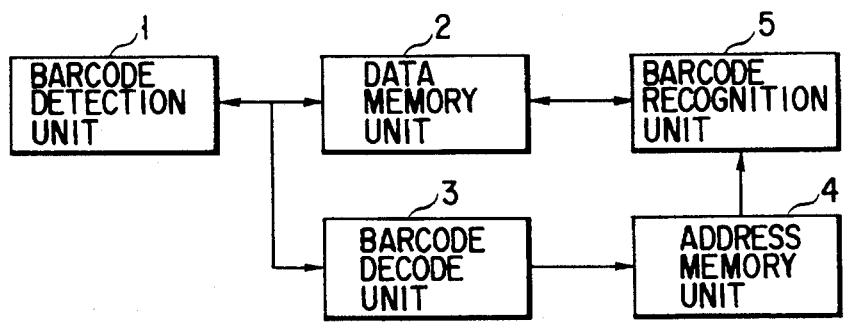
FIG. 30 is a block diagram of a conventional barcode reading apparatus.

FIG. 27 shows the outer appearance of a barcode reader 68 according to the seventh embodiment of the present invention. In this embodiment, the card 12 on which the barcode symbol 10 is recorded is inserted into an insertion port 70 of the card reader 68. Note that various LEDs 72 for indicating the states of the card reader 68 are arranged on the reader 68.

FIG. 28 is a block diagram of the barcode reader 68 of this embodiment. The same reference numerals in FIG. 28 denote the same parts as in FIG. 23 of the sixth embodiment, and a detailed description thereof will be omitted.

The barcode reader 68 of this embodiment comprises a card driving unit 74 for feeding the card 12 inserted into the insertion port 70, and a speed control unit 76 for controlling the feed speed of the card 12 in place of the speed detection unit 58 of the sixth embodiment.

The card driving unit 74 comprises a card receiving portion 78, a motor 80, and the like, as shown in FIG. 29A. When the card 12 is inserted from the insertion port 70 and the leading end of the card 12 contacts a switch 82 as the card detection unit 26 arranged at the deep side of the card receiving portion 78, a pressing plate 84 of the card receiving portion 78 stands up, and fixes the card 12 on the card receiving portion 78. Thereafter, when the read operation is started in accordance with the read start command from the card detection unit 26, the motor 80 is driven to move the card receiving portion 78 along rails 86.

At this time, the speed control unit 76 performs servo control of the motor 80, so that the card receiving portion 78 is moved at a predetermined moving speed. The write controller 42 controls a write enable signal of the FIFO memory 44 at a predetermined timing in synchronism with the moving speed of the card 12, which has reached the predetermined speed, in addition to the write access enable/disable signal from the pointer management block 56.

In this embodiment, after the card 12 is fixed on the card receiving portion 78, the card receiving portion 78 is moved at a constant speed. Alternatively, after the card 12 is fixed on the card receiving portion 78, the line sensor 24 may be moved at a constant speed.

(Eighth Embodiment)

FIG. 29B shows the eighth embodiment of the present invention. In this embodiment, a card is slid along the slit 16 of the card reader as in the sixth embodiment described above. Therefore, the card reader of this embodiment has substantially the same arrangement as that shown in FIG. 23, except for the arrangement of the speed detection unit. On a card 12' used in this embodiment, markers 88 are recorded together with the barcode symbol 10.

A sensor 90 is arranged in the slit 16 of the card reader, and detects the markers 88 recorded on the card 12' when the card 12' is slid along the slit 16. The speed detection unit detects the speed of the card 12' on the basis of a temporal change in markers 88 which are detected in turn, and executes the same processing as in the sixth embodiment described above.

In this embodiment, the independent sensor 90 is used for detecting the markers 88. However, a portion of the line sensor 24 for reading the barcode symbol 10 may be used.

As described above, according to the sixth to eighth embodiments of the present invention, a barcode reader which can shorten the decode time of barcode information without storing unnecessary information can be provided.

Since a read operation from a light-receiving element or a write operation in a memory element is controlled in synchronism with the moving speed, even when the moving speed of a barcode symbol recording medium is low or the scan speed is increased with respect to the moving speed of the barcode symbol recording medium, an unnecessary reading operation can be prevented, and the decode time can be prevented from being prolonged. By increasing the scan speed, even when the moving speed of the barcode symbol recording medium is high, rows can be prevented from being changed during scanning.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A barcode symbol reading apparatus comprising:

scan means for scanning a barcode symbol to be read, which is formed on a medium inserted in a predetermined direction at an arbitrary insertion speed, in a direction perpendicular to the predetermined direction so as to output a reading signal corresponding to the barcode symbol;

scan time detection means for detecting the number of times of scans which are performed by said scan means substantially in correspondence with the insertion speed of the medium on a predetermined portion of the barcode symbol on the basis of the reading signal output from said scan means;

skip time determination means for determining a number of times of skipping of data prior to execution of a scanning operation by said scan means, said skip time determination means including means for, when the number of times of scans on the predetermined portion of the barcode symbol, which is detected by said scan time detection means is larger than a predetermined number of times of scans, determining the number of times of skipping of the reading signal output from said scan means;

skip means for skipping the reading signal output from said scan means in accordance with the number of times of skipping determined by said skip time determination means so as to decrease a data amount of the reading signal output from said scan means; and decode means for decoding the barcode symbol to be read on the basis of the reading signal whose data amount is decreased by said skip means.

2. An apparatus according to claim 1, wherein said scan time detection means includes means for, when the barcode symbol to be read is a multiple-row barcode symbol, counting the number of times of continuous reading of a first row of the multiple-row barcode symbol.

3. A barcode symbol reading apparatus, comprising:

scan means for scanning a barcode symbol to be read, which is formed on a medium inserted in a predetermined direction at an arbitrary insertion speed, in a direction perpendicular to the predetermined direction so as to output a reading signal corresponding to the barcode symbol;

scan time detection means for detecting the number of times of scans which are performed by said scan means substantially in correspondence with the insertion speed of the medium on a predetermined portion of the barcode symbol on the basis of the reading signal output from said scan means;

skip time determination means for, when the number of times of scans on the predetermined portion of the barcode symbol, which is detected by said scan time detection means is larger than a predetermined number of times of scans, determining the number of times of skipping of the reading signal output from said scan means;

skip means for skipping the reading signal output from said scan means in accordance with the number of times of skipping determined by said skip time determination means so as to decrease a data amount of the reading signal output from said scan means; and decode means for decoding the barcode symbol to be read on the basis of the reading signal whose data amount is decreased by said skip means; and wherein said skip time determination means includes means for determining the number of times of skipping of the reading signal in correspondence with a relative moving speed between the barcode symbol to be read and said scan means, which relative moving speed is detected on the basis of the reading signal output from said scan means.

4. An apparatus according to claim 3, wherein said scan time detection means includes means for counting the number of times of scans of said scan means until the barcode symbol to be read reaches said scan means.

5. An apparatus according to claim 3, wherein said skip time determination means includes means for dynamically changing the number of times of skipping of the reading signal by re-checking the relative moving speed at a predetermined time interval.

6. A barcode symbol reading apparatus comprising:

image pickup means for scanning a barcode symbol to be read, which is formed on a medium inserted in a predetermined direction at an arbitrary insertion speed, in a direction perpendicular to the predetermined direction so as to output a reading signal corresponding to the barcode symbol;

binarization means for binarizing the reading signal output from said image pickup means and for outputting a pulse signal;

pulse width count means for counting widths of bars and spaces of the barcode symbol, which are included in the pulse signal output from said binarization means;

memory means for storing width information of the bars and spaces of the barcode symbol, which are counted by said pulse width count means; and data processing means for detecting the number of times of scans which are performed by said image pickup means substantially in correspondence with the insertion speed of the medium on a predetermined portion of the barcode symbol on the basis of the width information of the bars and spaces of the barcode symbol, which are stored in said memory means, for, when the detected number of times of scans on the predetermined portion of the barcode symbol is larger than a predetermined number of times of scans, determining the number of times of skipping of the reading signal output from said image pickup means, for skipping the reading signal output from said image pickup means in accordance with the determined number of times of skipping so as to decrease a data amount of the reading signal output from said image pickup means, and for decoding the barcode symbol to be read on the basis of the reading signal whose data amount is decreased.

7. An apparatus according to claim 6, wherein said image pickup means includes a linear sensor.

8. An apparatus according to claim 7, further comprising:

driving means for supplying a clock signal to said linear sensor and to said pulse width count means.

9. An apparatus according to claim 8, further comprising:

insertion detection means for detecting insertion of the medium on which the barcode symbol to be read is formed.

10. An apparatus according to claim 9, wherein said data processing means starts said pulse width count means upon reception of an insertion detection signal from said insertion detection means.

11. An apparatus according to claim 9, further comprising:

count means for counting the number of pixel data output from said linear sensor; and first marker write means for, when said count means finishes a count operation of the number of pixels of said linear sensor, storing a special end mark indicating an end of each scan in said memory means by adding the mark at the end of the width information.

12. An apparatus according to claim 11, further comprising:

width memory means for reading out the width information of the bars and spaces of the barcode symbol, which are stored in said memory means, for one scan via said data processing means in accordance with the end mark, and for storing the readout width information.

13. An apparatus according to claim 8, further comprising:

discharge detection means for detecting discharge of the medium on which the barcode symbol to be read is formed; and first marker write means for storing a special mark indicating a discharge timing in said memory means upon reception of a discharge detection signal from said discharge detection means.

14. An apparatus according to claim 12, further comprising:

initializing scan data memory means for storing width information for each scan via said data processing means until a size and security level of the barcode symbol are determined.

15. An apparatus according to claim 14, wherein said data processing means comprises:

a high-speed calculation circuit for executing various kinds of processing of said data processing means;

a width data counter for counting the number of pieces of width information for each scan;

a threshold value register for storing a threshold value of the width information;

a comparison circuit for comparing the number of pieces of width information counted by said width data counter with the threshold value stored in said threshold value register;

a skip count register for storing the number of pieces of width information to be skipped;

a symbol size register for storing the size and security level of the barcode symbol;

a scan time/row register for counting the number of times of continuous reading of an identical row when the barcode symbol is a multiple-row barcode symbol; and a data matrix for storing data characters of the barcode symbol.

16. An apparatus according to claim 15, wherein said memory means includes a first-in first-out (FIFO) memory.

17. An apparatus according to claim 15, wherein said memory means includes a serial-in parallel-out (SIPO) memory.

18. An apparatus according to claim 15, wherein said memory means includes a plurality of first-in first-out (FIFO) memories, and said data processing means normally performs data processing by selecting only one of said plurality of FIFO memories and performs data processing by selecting other memories of said plurality of FIFO memories as needed.

19. An apparatus according to claim 15, wherein said data processing means further comprises:

read error discrimination means for discriminating a read error on the basis of the number of error characters stored in said data matrix corresponding to a scanned area of the barcode symbol.

20. A barcode symbol reading apparatus comprising:

insertion means for inserting a medium on which a barcode symbol to be read is formed;

scan means for scanning the barcode symbol formed on the medium inserted by said insertion means;

memory means for storing a reading signal from said scan means;

speed detection means for detecting a moving speed of the medium inserted by said insertion means; and control means for controlling to write the reading signal from said scan means in said memory means on the basis of the moving speed of the medium detected by said speed detection means, so as to achieve a predetermined number of times of write accesses per row of the barcode symbol.

* * * * *